US011960542B2

(12) United States Patent
Vant et al.

(10) Patent No.: US 11,960,542 B2
(45) Date of Patent: Apr. 16, 2024

(54) METHODS AND SYSTEMS FOR BUILDING AND/OR USING A GRAPH DATA STRUCTURE

(71) Applicant: Xero Limited, Wellington (NZ)

(72) Inventors: Kendra Vant, Wellington (NZ); Soon-Ee Cheah, Wellington (NZ); Rebecca Dridan, Wellington (NZ); Shannon Pace, Wellington (NZ)

(73) Assignee: Xero Limited, Wellington (NZ)

( * ) Notice: Subject to any disclaimer, the term of this patent is extended or adjusted under 35 U.S.C. 154(b) by 0 days.

(21) Appl. No.: 18/201,310

(22) Filed: May 24, 2023

(65) Prior Publication Data

US 2023/0297619 A1 Sep. 21, 2023

Related U.S. Application Data

(63) Continuation of application No. PCT/NZ2022/050152, filed on Nov. 24, 2022.

(30) Foreign Application Priority Data

Nov. 24, 2021 (AU) .................................. 2021903791

(51) Int. Cl.
*G06F 16/901* (2019.01)
*G06F 16/23* (2019.01)
*G06F 16/9535* (2019.01)

(52) U.S. Cl.
CPC ...... *G06F 16/9024* (2019.01); *G06F 16/2365* (2019.01); *G06F 16/9535* (2019.01)

(58) Field of Classification Search
None
See application file for complete search history.

(56) References Cited

U.S. PATENT DOCUMENTS

| 6,266,649 B1 | 7/2001 | Linden et al. | |
| 2012/0291022 A1* | 11/2012 | Mehta | G06F 8/60 717/176 |
| 2013/0185292 A1* | 7/2013 | Li | G06F 16/22 707/723 |

(Continued)

FOREIGN PATENT DOCUMENTS

| CN | 110020152 A | 7/2019 |
| WO | 2020/133398 A1 | 7/2020 |

OTHER PUBLICATIONS

Nadeesha Cabral; Designing a Graph Data Structure in a Relational Database; Mar. 28, 2020; 9 pages; https://levelup.gitconnected.com/designing-a-graph-data-structure-in-a-relational-database-e13ffb857ce2.

*Primary Examiner* — Alex Gofman
*Assistant Examiner* — Umar Mian
(74) *Attorney, Agent, or Firm* — Young Basile Hanlon & MacFarlane, P.C.

(57) ABSTRACT

Methods comprising determining a dataset of entries, each comprising an entity identifier and associated application identifier(s) are provided. One method comprises determining a set of application pairs from the dataset; determining a correlation score for each application pair based; responsive to the correlation score exceeding a threshold correlation value: determining application identifiers of the application pair as being correlated; providing a correlation write request comprising the applications identifiers of the pair to an app recommender database.

10 Claims, 19 Drawing Sheets

(56) References Cited

U.S. PATENT DOCUMENTS

| | | | |
|---|---|---|---|
| 2014/0317031 A1* | 10/2014 | Babenko | G06Q 30/0631 |
| | | | 706/46 |
| 2015/0169758 A1* | 6/2015 | Assom | G06F 16/36 |
| | | | 707/603 |
| 2016/0188671 A1* | 6/2016 | Gupta | H04L 51/214 |
| | | | 707/722 |
| 2017/0353603 A1* | 12/2017 | Grunewald | G06Q 30/0631 |
| 2018/0067734 A1* | 3/2018 | Prasad | G06F 11/3438 |
| 2021/0304281 A1* | 9/2021 | Goshen | G06Q 30/0201 |

* cited by examiner

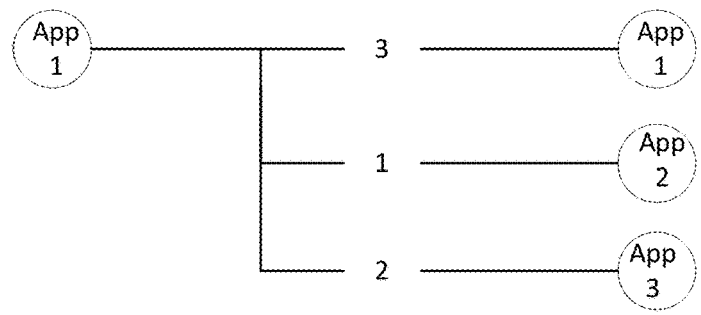
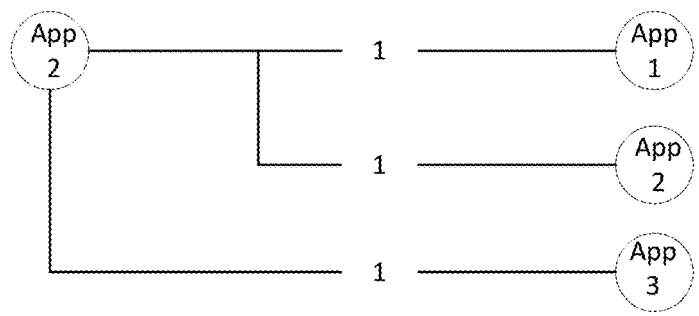
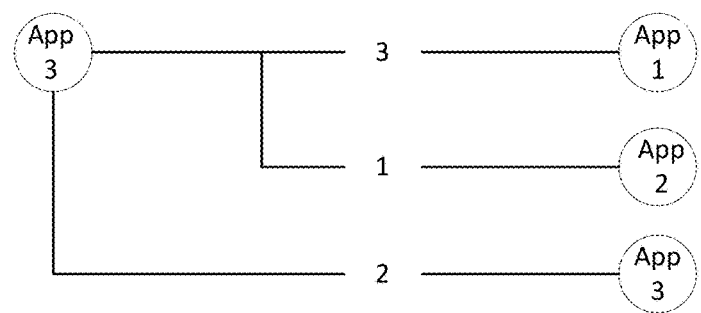
Figure 16

1800

```
┌─────────────────────────────────────────────────────────────┐
│ Determine a list of objects of the first object type         │
│ associated with each object of the first object type         │
│                        1802                                  │
└─────────────────────────────────────────────────────────────┘
                              ↓
┌─────────────────────────────────────────────────────────────┐
│ Determine a dataset of pair(s) of first object types, each   │
│ pair having an associated count indicative of a number of    │
│ common objects of a same object type joined to the objects   │
│ of the pair by one hop                                       │
│                        1804                                  │
└─────────────────────────────────────────────────────────────┘
                              ↓
┌─────────────────────────────────────────────────────────────┐
│ Determine a correlation score for each pair of objects of    │
│ the first object type                                        │
│                        1806                                  │
└─────────────────────────────────────────────────────────────┘
                              ↓
┌─────────────────────────────────────────────────────────────┐
│ Responsive to the correlation score for a first object type  │
│ pair exceeding a threshold correlation value, determine the  │
│ first object type pair as being correlated                   │
│                        1808                                  │
└─────────────────────────────────────────────────────────────┘
                              ↓
┌─────────────────────────────────────────────────────────────┐
│ For each correlated pair (or a batch of correlated pairs),   │
│ generate a write request comprising the first object type    │
│ identifiers of the correlated pair (or batch of correlated   │
│ pairs)                                                        │
│                        1810                                  │
└─────────────────────────────────────────────────────────────┘
                              ↓
┌─────────────────────────────────────────────────────────────┐
│ Provide write request to a database for storage              │
│                        1812                                  │
└─────────────────────────────────────────────────────────────┘
```

Figure 18

METHODS AND SYSTEMS FOR BUILDING AND/OR USING A GRAPH DATA STRUCTURE

CROSS-REFERENCE TO RELATED APPLICATION(S)

This application is continuation of International Patent Application Serial No. PCT/NZ2022/050152, filed on Nov. 24, 2022, which claims priority to and the benefit of Australian Patent Application Serial No. 2021903791, filed Nov. 24, 2021, the entire disclosures of which are hereby incorporated by reference.

TECHNICAL FIELD

Embodiments generally relate to methods, systems, and computer-readable media for building a graph data structure, and in some embodiments, for using the graph data structure to provide services and/or products.

BACKGROUND

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

Some embodiments relate to a method comprising: determining a dataset comprising a plurality of entries, each entry comprising an entity identifier and one or more associated application identifiers, each application identifier identifying an application used by an entity of the respective entity identifier; determining a set of application pairs from the dataset, each application pair comprising a first application identifier and a second application identifier; determining a correlation score for each application pair of the set based on the association of the first and second application identifiers of the application pair with the plurality of entity identifiers of the dataset; responsive to the correlation score for an application pair exceeding a threshold correlation value: determining the first and second application identifiers of the application pair as being correlated; determining a correlation write request comprising the first and second applications identifiers of the application pair; and providing the correlation write request to an app recommender database. For example, providing the correlation write request to an app recommender database may comprise providing a write interface of an app recommender graph interface module for writing to respective tables of an app recommender graph structure.

The correlation score may be indicative of a frequency of a first and second application of the application pair both being associated with a same organization identifier of the organization identifiers of the dataset relative to the frequency of the first application and the second application being independently associated with the organization identifiers of the dataset. Determining the correlation score may comprise determining pointwise mutual information (PMI) of the application pairs.

In some embodiments, each entry of the dataset comprises a time stamp indicative of the freshness of a relationship between the entity identifier and the application identifier and wherein the method may further comprise prior to determining the set of application pairs from the dataset and responsive to the timestamp being greater than a threshold, determining the entry as stale and excluding it from the dataset.

In some embodiments, the method may further comprise determining a usage relationship between each of the one or more application identifiers and the respective entity identifier of the dataset; for each entity identifier and application identifier pair: determining a usage write request comprising the entity identifier and application identifier of the pair; providing the usage write request to a write interface of a graph interface module for writing to respective tables of a graph structure.

Each entry of the dataset may comprise a time stamp indicative of the freshness of a relationship between the entity identifier and the application identifier and where the method further comprises: prior to determining the usage write request and responsive to the timestamp being greater than a threshold, determining the entry as stale and excluding it from the dataset.

In some embodiments, determining the dataset comprises: for each entry of the database, determining connection data between the entity identifier and each application identifier of the one or more associated application identifiers, wherein the connection data is indicative of a connection request being made by the entity of the entity identifier to an application service provider providing the application of the application identifier.

In some embodiments, responsive to determining connection data between an entity identifier of the plurality of entity identifiers and a respective application identifier, the method comprises inferring that the entity of the entity identifier has used the application of the application identifier.

In some embodiments, providing the correlation write request to the write interface of the app recommender graph interface module comprises: determining a plurality of correlation write requests to be written to the app recommender graph structure; collating the plurality of correlation write requests as a batch write request; and providing the batch write request to the write interface of the app recommender graph interface module.

Some embodiments relate to a method comprising: determining an interest by an entity in a first application; determining an application recommendation read request, the application recommendation read request comprising a first application identifier of the first application; sending the application recommendation read request to a read interface of an app recommender graph interface module for determining one or more application recommendations from an application correlation table of a app recommender graph structure; receiving, from the read interface, a response comprising the one or more application recommendations; and providing, to the entity, the one or more application recommendations.

The application recommendation read request may comprise a vertex field and an edge field, and wherein the first application identifier is provided in the vertex field and an application recommendation identifier is provided in the edge field.

Providing, to the entity, the one or more application recommendations may comprise providing the one or more application recommendations to a user interface of a computing device.

Determining an interest by an entity in a first application may comprise: monitoring search requests made by the user within an accounting platform provided by a server; and responsive to determining that a search request comprises a target application, determining the target application as the first application. Determining an interest by an entity in a first application may comprise: monitoring for a connection request by the entity to an application service provider providing a target application; and responsive to determining that a connection request is made, determining the target application as the first application. Determining an interest by an entity in a first application may comprise: determining an association read request, the association read request comprising an entity identifier for the entity; sending the association read request to the read interface of the graph interface module for determining one or more applications associated with the entity from an association table of the graph structure; receiving, from the read interface, a response comprising one or more applications; and determining one of the one or more applications as the first application.

The application correlation table of the graph structure may be generated according to any one of the described methods.

Some embodiments relate to method comprising: receiving a correlation write request, the correlation write request comprising first and second applications identifiers of an application pair; writing the first and second applications identifiers to respective first and second vertex tables of an application recommendation graph structure, the first and second vertex tables having respective first and second application keys; writing the first and second application keys to an edge table of the application recommendation graph structure, the edge table being indicative of an correlation between applications; receiving an application recommendation read request, the application recommendation read request comprising a target application identifier of a target application; determining an application key in a vertex table for an application based on the target application identifier; determining, using the application key, one or more recommended applications from the edge table; and providing a response to the application recommendation read request, the response comprising the one or more application recommendations.

Some embodiments relate to method comprising: determining a first dataset comprising a plurality of entries, each entry comprising a first object identifier and one or more associated second identifiers, each second identifier identifying a second object associated with a first object of the first identifier; determining one or more pairs of identifiers, each pair of identifiers comprising the first object identifier and one of the one or more second object identifiers; and for each of the one or more pairs of identifiers: determining a write request comprising first and second vertices of an association edge, wherein the first and second vertices correspond with the respective first and second object identifiers of the pair; and providing the write request to a write interface of a graph interface module for writing to respective tables of a graph structure. The first and second objects may correspond with data items recoded in a database accessible to an accounting platform.

In some embodiments, each entry of the first dataset comprises a time stamp indicative of the freshness of a relationship between the first object identifier and the respective one or more second object identifiers and where the method further comprises: prior to determining the write request and responsive to the timestamp being greater than a threshold, determining the entry as stale and excluding it from the first dataset.

The first object identifier may be an entity identifier, and the one or more second object identifiers may be application identifiers. Determining the dataset may comprise: for each entry of the database, determining connection data between the first object identifier and each second object identifier of the one or more second object identifiers, wherein the connection data is indicative of a connection request being made by the entity of the entity identifier to an application service provider providing the application of the application identifier. Responsive to determining connection data between an entity identifier and a respective application identifier, the method may comprise inferring that the entity of the entity identifier has used the application of the application identifier.

The first object identifier may be a first application identifier, and the one or more second object identifiers may be second application identifiers. Determining the first dataset may comprise: determining a second dataset comprising a plurality of entries, each entry comprising an entity identifier and one or more associated application identifiers, each application identifier identifying an application used by an entity of the respective entity identifier; determining a set of application pairs from the second dataset, each application pair comprising a first application identifier and a second application identifier; determining a correlation score for each application pair of the set based on the association of the first and second application identifiers of the application pair with the plurality of entity identifiers of the second dataset; and responsive to the correlation score for an application pair exceeding a threshold correlation value: determining the first and second application identifiers of the application pair as being correlated; and determining a correlation write request comprising the first and second applications identifiers of the application pair; and providing the correlation write request to a write interface of an app recommender graph interface module for writing to respective tables of an app recommender graph structure.

Providing the write request to the write interface of the graph interface module may comprise: determining a plurality of correlation write requests to be written to the graph structure; collating the plurality of correlation write requests as a batch write request; and providing the batch write request to the write interface of the graph interface module.

Some embodiments relate to method comprising: determining a request from a user via a user interface for association information for a first object; determining an association read request, the association read request comprising a first object identifier of the first object; sending the association read request to a read interface of a graph interface module for determining one or more associated objects from an object association table of a graph structure; receiving, from the read interface, a response comprising the one or more second objects; and providing, to the user, the one or more second objects. The user interface may be a user interface provided by an accounting platform.

The association read request may comprise a vertex field and an edge field, and wherein the first object identifier is provided in the vertex field and an association identifier is provided in the edge field.

Providing, to the user, the one or more second objects may comprise providing the one or more second objects to the user interface of a computing device.

The association table of the graph structure may be generated according to any one of the described methods.

Some embodiments relate to a method comprising: receiving an association write request, the association write request comprising first and second object identifiers; writing the first and second object identifiers to respective first and second vertex tables of a graph structure, the first and second vertex tables having respective first and second object keys; writing the first and second object keys to an edge table of the graph structure, the edge table being indicative of an association between objects; receiving an association read request, the association read request comprising a target object identifier of a target object; determining a target object key in a vertex table for an object based on the object identifier; determining, using the target object key, one or more second objects from the edge table; and providing a response to the association read request, the response comprising the one or more second objects.

Some embodiments relate to a method comprising: determining a first dataset comprising a plurality of entries, each entry comprising a second object type identifier and one or more associated first object type identifiers, wherein a first object type of the first object type identifier is different from a second object type of the second object type identifier; determining a set of first object type pairs from the first dataset, each first object type pair comprising a first object identifier of the first object type and a second object identifier of the first object type; determining a correlation score for each first object type pair of the set based on the association of the first and second object identifiers of the first object type pair with the plurality of second object type identifiers of the first dataset; responsive to the correlation score for a first object type pair exceeding a threshold correlation value: determining the first and second object type identifiers of the first object type pair as being correlated; determining a correlation write request comprising the first and second identifiers of the first object type pair; and providing the correlation write request to a correlation data database.

Some embodiments relate to a method comprising: determining a second dataset of one or more pairs of objects of a first object types, each pair having an associated count indicative of a number of times the objects of the pair both associated with an object of a second different object type; determining a correlation score for each pair of objects of the first object type; responsive to the correlation score for a first object type pair exceeding a threshold correlation value, determining the first object type pair as being correlated; for one or more of the correlated pairs, generating a write request comprising the first object type identifiers of the correlated pair (or batch of correlated pairs); and providing the write request to a database for storage.

In some embodiments, determining the second dataset comprises: determining a third dataset, the third dataset comprising a list of objects of the first object type, and for each object, a set of objects of the first object type associated with the each object; and determining the count for each object of the first object type associated with the candidate object; and populating a relevant cell of a first object type×first object type table with the total count.

In some embodiments, determining the third dataset comprises: sending a first request to a read interface of a graph structure, wherein the first request is populated with a first object type identifier in a first field and the first object type identifier in a second field; and receiving from the read interface, the third dataset.

In some embodiments, determining the second dataset comprises: sending a second request to a read interface of a graph structure, wherein the first request is populated with a first object type identifier in a first field and the object type identifier in a second field; and receiving from the read interface, the second dataset.

In some embodiments, providing the correlation write request to a correlation database comprising providing a write interface of a graph interface module for writing to respective tables of a graph structure. The correlation score may be indicative of a frequency of both objects of the first object type pair being associated with an object of a second object type relative to the frequency of a first object and a second object of the pair each being independently associated with the object of the dataset. In some embodiments, determining the correlation score comprises determining pointwise mutual information (PMI) of the first object type pairs.

In some embodiments, each entry of the first dataset comprises a time stamp indicative of the freshness of a relationship between the second object type identifier and the respective first object type identifier, the method further comprises: prior to determining the set of first object type pairs from the first dataset and responsive to the timestamp being greater than a threshold, determining the entry as stale and excluding it from the first dataset.

In some embodiments, providing the correlation write request to the write interface of the graph interface module comprises: determining a plurality of correlation write requests to be written to the graph structure; collating the plurality of correlation write requests as a batch write request; and providing the batch write request to a write interface of the graph interface module.

Some embodiments relate to a method comprising: receiving, by a read interface associated with a graph structure, a read request comprising a source object type and a target object type; for each source object of the source object type in the graph structure, determining, by the read interface, one or more objects of a second object type connected to the source object; for each object of the second object type, determining, by the read interface, one or more target objects of the target object type; and providing a response to the read request, wherein the response is based on the determined one or more target objects of the target object type. The response may comprise a list of objects of the source object type, and for each object, a set of objects of the target object type associated with the each object.

Some embodiments relate to a method comprising: receiving, by a read interface associated with a graph structure, a read request comprising a source object type, a target object type and a count request for each source and target object pair, wherein the count request is a request for a number of times both objects of a target object type and source object type pair are both directly associated with objects of a second object type; determining, by the read interface, a transformed query for providing to a data store of the graph structure; providing the transformed query to the data store; receiving a query response from the data store, wherein the query response comprises a dataset comprising the determined source object and target object pairs, and a count value associated with each pair; and providing a response to the read request, wherein the response comprises the query response. The data store may be a PostgreSQL data store. The read request may be in the form of a GraphQL query and the transformed query may be in the form of a PostgreSQL query.

Some embodiments relate to a system comprising: one or more processors; and memory comprising computer executable instructions, which when executed by the one or more processors, cause the system to perform any one of the described methods.

Some embodiments relate to a computer-readable storage medium storing instructions that, when executed by a computer, cause the computer to perform the method of any one of the described methods.

BRIEF DESCRIPTION OF THE DRAWINGS

Various ones of the appended drawings merely illustrate example embodiments of the present disclosure and cannot be considered as limiting its scope.

FIG. 16 is a schematic representation of an output from a graph read interface in response to the further modified query in the form of: "Node A Node A (with count)".

FIG. 18 is a process flow of a method for generating object type correlation data, according to some embodiments.

DETAILED DESCRIPTION

Embodiments generally relate to methods, systems, and computer-readable media for generating or building a graph data structure, such as a knowledge graph, of raw data. Information of the graph data structure may be assembled incrementally, and for example, the graph data structure may be incrementally updated and/or added to. Some embodiments relate to using the graph data structure to provide services and/or products.

The graph data structure (or "graph") may represent a network of entities (such as people or things), for example entities associated with an accounting platform, and the information and relationships known about those entities. The graph may be an enriched information interface, which may be capable of providing a coherent and/or enhanced view of knowledge about the network of entities. The graph may be generated or created based on raw data derived from how the accounting platform is used by organizations to manage their accounting needs.

Figure 4:
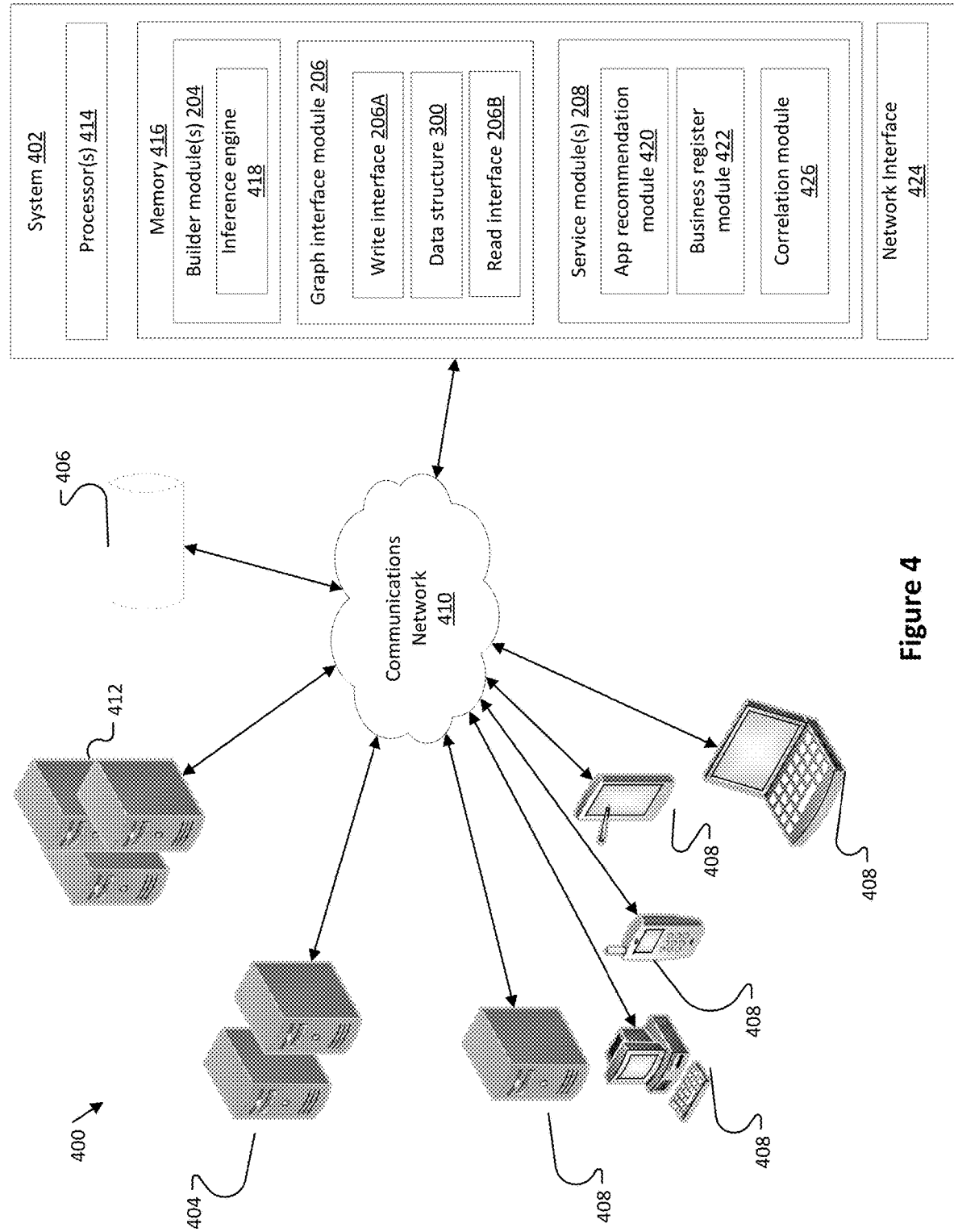
FIG. 4 is a block diagram of a system for generating and using a graph data structure, according to some embodiments.

The raw data may be fragmented, inconsistently named, under documented and/or difficult to interpret. The raw data may be data collected and stored in a database. For example, the raw data may be accumulated and stored in a database 406 accessible to an accounting system or platform 404 for managing accounts (such as maintaining bookkeeping accounts) associated with a plurality of businesses or organizations, as depicted in FIG. 4 discussed below. The raw data may comprise entity information. For example, entity information may comprise information about particular organizations such as financial or banking information, accounting information, type of organization, practice area, number of people employed by the organization, applications ("apps") used or downloaded by the organization, and which, for example integrate with their user account with the accounting platform 404, contacts of the organization, such as people or other organizations that do business, or are otherwise relevant or related to the organization.

Figure 1:
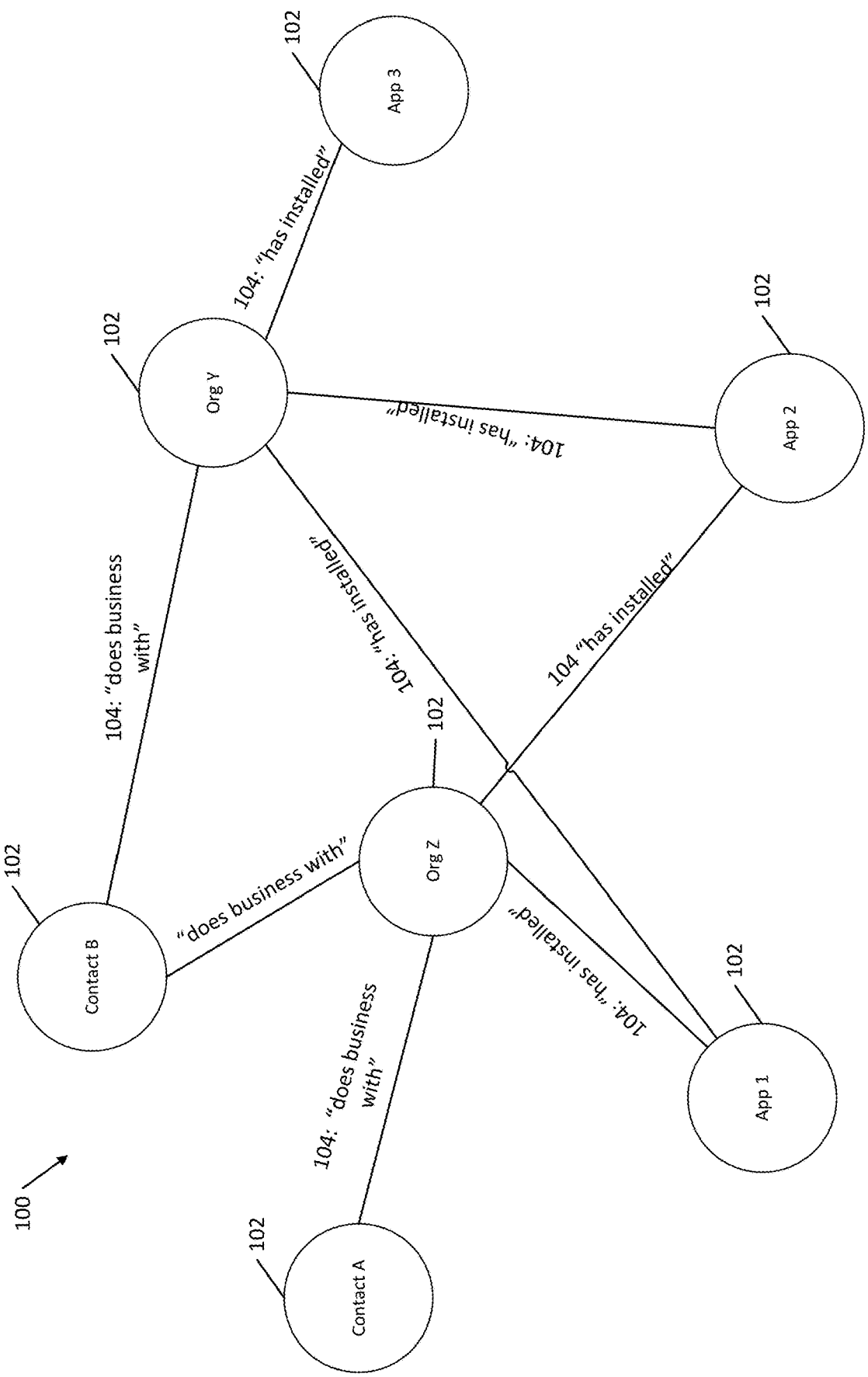
FIG. 1 is a schematic illustration of an example graph data structure, according to some embodiments.

An example of a knowledge graph 100 is depicted in FIG. 1. The graph comprises a plurality of nodes or vertices 102, some of which are connected or interconnected with or to other vertice(s) by edge(s) 104. The graph 100 may comprise multiple different types of vertices. For example, vertex types may be organizations, apps, employees, contacts, business types, partners, interactions such as events or transactions, etc. For example, an interaction may be a financial transaction or an API call to an app. Each vertex 102 may have a plurality of fields, which may be mandatory or optional. Each field may be populated with a property of the vertex 102.

The vertice(s) 102 of the graph may be determined from the raw data. One or more vertice(s) 102 may be associated with a respective object of the raw data, for example, that is, representative of a real world entity. Accordingly, vertice(s) may be determined, in that they may be identified or obtained directly from the raw data. Where the vertex 102 is an object, it may be mapped to an object of the raw data, for example, using an object identifier. In some embodiments, vertice(s) may be inferred or deduced from the raw data, or from objects of the raw data, or from vertices and/or edges of the graph 100 itself. For example, the object type "business type" may be inferred from contact and organization information of the raw data. For example, it may be inferred that an organization "St. Mary's" that is associated with contact "Melbourne School Supplies" is a school (i.e., a particular business type). In such an example, the vertex 102 representing the business may be connected to a vertex 102 of "school" using an edge 104 "is".

Each edge 104 defines a relationship between two vertices 102, for example, that is representative of a fact or state that holds between the two vertices 102. The relationship may be determined from the raw data, or may be inferred from the raw data based on interactions or transitivity between objects of the raw data, and/or edges 104 and/or vertices 102 in the graph 100. For example, the inferred relationship (or inferred edge) may not be captured in the raw data. The inference may be based, for example, on properties of the two vertices 102 joined or connected by the inferred edge 104 (for example, similarity in name and potentially similarity in other metadata), interactions that have been recorded (in the raw data and/or the graph 100) between the items of information (objects or inferred objects) represented by the specific vertice(s), or logical implications. An example of a logical implication may be knowledge that Org Z and Org Y are related, and that Org Z and Org X are related, and the deduction that based on these relationships it follows that Org Y and Org X are related.

The graph 100 may comprise multiple different types of relationships and accordingly, the edge(s) of the graph 100 may be associated with different relationship types. For example, a relationship type may be "has installed", "does business with", "is the same as", "works for", "employs", etc. The graph 100 may comprise multiple edges 104, for example, of different edge types, between the same two vertices 102. In some embodiments, each edge 104 may be representative of an individual interaction between the entities (objects or inferred objects) of the two vertices 102 interconnected by the edge 104. For example, each edge 104 may be representative of an edge type and a specific interaction. Each edge 104 may have a plurality of fields, which may be mandatory or optional.

The graph 100 may therefore represent different semantic relationships between types of vertices 102. Referring to the example of FIG. 1, graph 100 comprises vertex 102 "Org Z", which is connected to vertex 102 "App 1" by edge 104 "has installed", demonstrating the relationship between the objects Org Z and App 1. Similarly, vertex 102 "Org Y" is connected to vertex 102 "Contact B" by edge 104 "does business with" demonstrating the relationship between objects Org Y and Contact B.

In some embodiments, additional or aggregated information about the vertice(s) 102 and/or edge(s) 104 may be surfaced or stored as metadata annotated on the respective vertex 102 and/or edge 104. For example, where two vertices 102 are interconnected by an edge 104 that is representative of the relationship between the two vertices 102, additional or aggregated information about interactions between the two vertices may be recorded or stored as metadata annotated on the respective edge 104.

Figure 2:
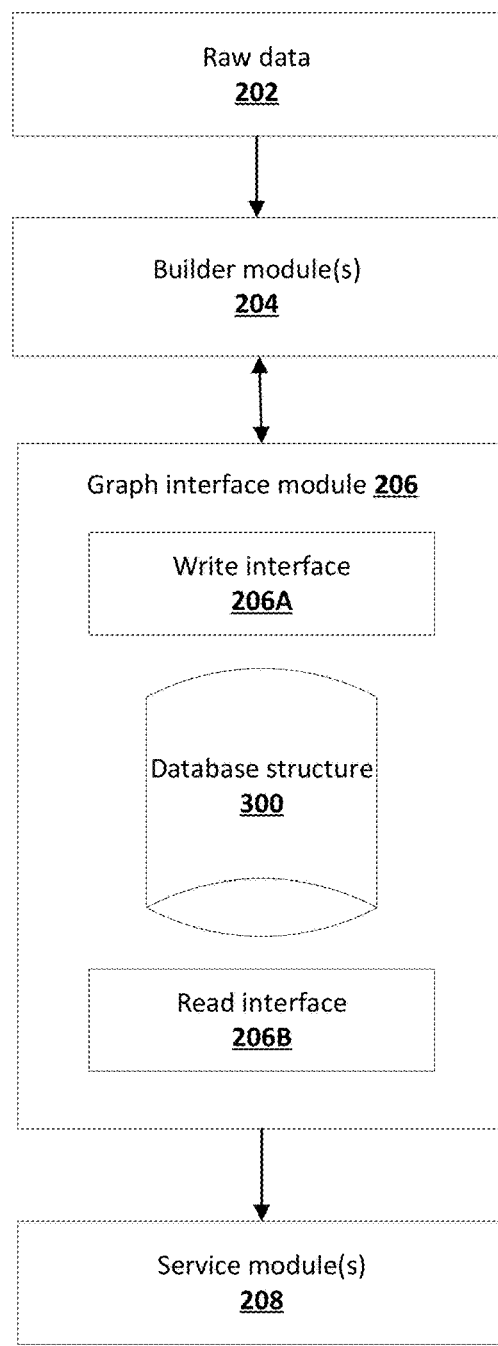
FIG. 2 is a schematic of a process flow for the generation and use of a graph data structure, according to some embodiments.

Referring now to FIG. 2, there is shown a block diagram of a high level overview 200 for generating or building the graph 100 and for using the graph 100 to provide various services, according to some embodiments.

A source of information for the generation of the graph 100 may be raw data 202. As mentioned above, the raw data 202 may comprise information derived from a database 406 (FIG. 4), such as a relational database, such as may be accessible to and used by an accounting system or platform. The database 406 may comprise information about a plurality of organizations having accounts with or otherwise managed by an accounting system 404 (FIG. 4). The raw data 202 may comprise data records derived from data streams of information, which may be acquired in real time, for example, using Amazon Kinesis Data Stream. The raw data 202 may comprise files. The raw data 202 may comprise application protocol interface (API) information.

FIG. 2 illustrates one or more builder modules 204, configured to assemble relevant raw data 202 and determine edge(s) 104 and/or vertices 102 for contributing to the graph 100. The builder module 204 may be configured to determine edge(s) 104 and/or vertices 102 based on corresponding objects and/or object relationships as defined in the raw data, and/or may be configured to infer edges and/or vertice(s) based on information defined in the raw data or the graph 100, or derived or deduced from the raw data 202 and/or graph 100. In some embodiments, the builder module(s) 204 may be configured to determine edge(s) 104 and/or vertices 102 continuously, in an event-driven manner (for example, in response to receiving event streams comprising relevant raw data from a streaming source or streaming platform), on a periodic or scheduled basis, or on an aperiodic or ad hoc basis. Different builder modules 204 may determine edge(s) 104 and/or vertices from different sources of or sets of assembled relevant raw data and/or may perform different methods. In some embodiments, multiple builder modules 204 may create the same types of vertices and/or edges. Additional builder module(s) 204 may be added on an ad hoc basis as required to facilitate growth of the graph 100. In some embodiments, builder modules 204 may be configured to determine or assemble data for adding or contributing or storing in data storage or data structures, such as a relational databases or non-relational databases or tabular data structure.

Once the builder module(s) 204 have determined vertices 102 and/or edge(s) 104, the builder module(s) 204 may create, update, insert and/or upsert relevant table(s) of the graph 100 by cooperating with a graph interface module 206.

Data may be loaded to the graph 100 in batches, individual or single records may be updated, or small and incremental batch loads may be collated to insert and/or update the graph 100. The additions or updates to the graph data structure 100 may be driven by upstream data sources, such as sources of raw data 202, and may be batch or event-driven/streaming. For example, the builder module(s) 204 may transmit messages, such as publish event messages, to add to or update the graph data structure 100. The builder module(s) may be configured to provide messages to a single pipeline for feeding to the write interface 206A of the graph interface module 206. For example, the builder module(s) 204 may publish to a single event stream which is provided or fed to the write interface 206A of the graph interface module 206.

In some embodiments, builder module 204 may be configured to update the graph 100 using an "insert" mode, i.e. the existing information is retained, and new information is inserted between existing information. "Insert" mode requests are batched and processed by builder module 204 at given periods, such as daily. "Insert" mode may provide the benefit of traceability, with every interaction being recorded. This would provide options for auditability and traceability. This may also allow for an option to view the graph 100 at a particular point in time. However, as the graph 100 scales in terms of the number and/or types of vertices and/or edges, the number of changes or updates may become relatively large. One possible example is if transactions were used to infer customer/supplier relationships between businesses.

With the number of potential transactions being processed by an accounting platform daily, the number of updates is likely to get very large. In some embodiments, the builder module(s) 204 may be configured to update the graph 100 using an update "in place" mode, i.e., the existing information is destroyed and replaced with the new information, or saved over. This would have the benefit of reducing query time resources, for example, as may be required to filter most recent records were an "insert" mode used instead. This may be appropriate where there are no specific or restrictive auditing requirements or expected circumstances where long term or indefinite retention of the raw data within the graph data structure 100 might be required.

The builder module(s) 204 may be capable of triggering random or ad hoc access updates. There may be situations where multiple builder modules 204 are attempting to create and/or update or are creating and/or updating the same edge or node types. As an example, there might be multiple builder module(s) 204 each running processes that need to add to the graph 100 "Organization" nodes that might not yet exist. These situations may be accommodated for by the builder modules 204 cooperating with a write interface 206A of a graph interface module 206 of the system, as opposed to allowing direct access, or writes, to a data store or database structure 300, such as a relational data store that underpins the graph data structure 100, or by which the graph data structure is represented.

Messages or notifications associated with write requests may be indicative of a connection or relationship having been determined (identified or inferred) between two or more entities, which may be vertices 104 that exist in the graph data structure 100, or which do not yet exist in the graph data structure 100. Each write that results from a message may be an upsert for objects or inferred objects identified in the message. In some embodiments, messages comprising data considered stale are not written or upserted to the data store 210. Messages may comprise details of the connection (edge) as well as the connected entities (vertices). They may be self-contained. They may comprise sufficient data to allow the write interface 206A of the graph interface module 206 to complete a write request to the data store 210, and may, for example, include all information necessary to populate corresponding tables in the data store 210. In some embodiments, the messages may be event messages or events. For example, the builder modules 204 may publish or stream events to the write interface 206A of the graph interface module 206.

Messages or events may comprise a message structure which includes a plurality of elements, each being associated with one or more fields. In some embodiments, the message structure, which may be an event message structure, may be provided inside a CloudEvent wrapper. The message structure may be based on the CloudEvent specification, with the Kafka protocol binding (structured content mode).

The message structure may comprise a triple structure, which may comprise an edge, a source vertex and a target vertex. For example, each element of the triple may be a data object.

An example triple structure for an event message structure is provided below. In this example, the relationship being defined by the edge 104 is "app installed", the source entity or source vertex is an organization, and the target entity or target vertex is an app.

```
{
  "specversion" : "1.0"
  "type" : "com.xero.xero-graph" ,
  "source" : "/context/builder" ,
  "id" : "1234-1234-1234" ,
  "time" : "2018-04-05T03:56:24Z" ,
  "datacontenttype" : "application/json" ,
  "data" : {
    "type" : "app_installed"
    "attributes" : {
      "field_1" : ... ,
      "field_2" : ... ,
      "field_3" : ...
    } ,
    "source" : {
      "type" : "org" ,
      "object_id" : ... ,
      "attributes" : {
        "field_1" : ... ,
        "field_2" : ...
      }
    } ,
    "target" : {
      "type" : "app" ,
      "object_id" : ... ,
      "attributes" : {
        "field_1" : ... ,
        "field_2" : ...
      }
    }
  }
}
```

In some embodiments, there is no event key, such as a Kafka event key, associated with the message. This may be because there is no need for the messages to be ordered; messages, indicative of action requests, may be order invariant. This may make the system 200 easier to maintain and/or to scale. Omitting event keys may avoid complications when increasing the number of partitions for greater throughput, if necessary (and also avoiding the selection of a key-to-partition mapper). In the absence of event keys, messages may be distributed from builder modules 204 to available partitions on a round-robin basis, for example.

The builder module 204 may be configured to set or define an event ID ("id"). The combination of "source" and "id" may be unique for each unique event as per the CloudEvent specification. In this example, "time" is when the relationship ("occurrence" as per the CloudEvents specification) between vertices 102 came into being, through either creation (for example, by inference) or discovery (for example, by obtaining the information directly from the raw data 202). The vertex data may be assumed to be accurate at the relationship's creation time, which sets the currency for the vertices 102 and the edge 104. Any combination of the data objects in the event structure may be ignored for freshness reasons; that is, only data objects in the event that are fresher (i.e., more recent) than existing records are written, in some embodiments. "Type" identifies the entity (edge "data.type", source vertex "data.source.type" and target vertex "data.target.type") to which the data objects in the event message structure correspond. These may be mapped to tables 302 in the data structure 300 that represents the graph 100, as discussed in more detail below. "Source" and "target" identify the source ("from") and target ("to") vertices 102 or nodes 102 in a single direction edge. To create a bidirectional edge 104, the builder module 204 may submit two events with reversed "source" and "target" data objects. In some embodiments, the tables 302 in the data store 210 corresponding to objects have a column "object ID". The object ID may correspond with an object identifier for the entity within the raw data, as for example, may be derived from a database used by the accounting platform to provide accounting services, for example, organization ID. As "object ID" is a generic field name, rather than one specific to the builder module 204 and/or type, the value to use for lookups by natural key is clear, and the graph interface module 206 need not maintain a mapping between field names and natural keys for each vertex type. All "fieldX" values correspond to the same-name column in the table corresponding to the type ("type") of the entity. In some embodiments, additional fields, such as "attributes" may be populated, or omitted. In some embodiments, the "subject" CloudEvent metadata field, which is optional, may be omitted.

In some embodiments, the message structure may comprise metadata, edge information, first vertex (vertex A) information, second vertex (vertex B) information, and direction. For example, metadata may include a data freshness field, which may provide an age of the data, and which may be used for comparison against current records, if available, to mitigate against stale writes. Each of the elements for edge, first vertex and second vertex may include fields for the entity or relationship type, which may be determined from or inferred from the topic of the event. The information of each of the fields of the edge 104 and vertices 102 may be defined in an edge table and a vertex table, respectively. The direction element may be indicative of the direction of the edge, from which vertex to which, thereby indicating which is the source vertex and which is the target vertex. By including a direction of the edge in the event data object, builder modules 204 can create bidirectional edges without needing to publish two separate events. For example, this can be achieved by populating two different fields of the direction element. It also allows for fixed schemas for edges where the type of vertex A and B differ, avoiding union types for vertex_a and vertex_b.

In some embodiments, edge types may be symmetric, and as such, could be undirected. For example, an edge "is the same as" may be considered to be a symmetric edge type. In some embodiments, the message structure may comprise a second edge to demonstrate or define a symmetric relationship.

An example of a high level description of the content of a message structure may comprise or contain:
metadata:
  data freshness
  edge: fields for the edge's type (which may be inferred from the topic of the message)
    field1: defined by the edge table
    field2: . . .
  vertex_a: fields for the vertex's type (which may be inferred from the topic of the message)
    field1: defined by the vertex table
    field2: . . .
  vertex_b: fields for the vertex's type (which may be inferred from the topic of the message)
    field1: defined by the vertex table
    field2: . . .
  direction: [A_TO_B|B_TO_A|BIDIRECTIONAL]—the direction of the edge.

Event streaming may be well-suited for processing individual events from builder modules 204. In case of batch workloads, builder modules 204 may be configured to stream events as part of a transformation pipeline from the data source of raw data 202 to the event format, without the friction of request-response. As there are no strong auditing requirements nor expected circumstances where the graph 100 would need to be recreated, the graph interface module 206 does not require long-term/indefinite retention of the raw data. In some embodiments, where the builder module 204 provides updates to the graph data structure 100 using eventing, eventing platform support, such as PaaS Eventing, or other managed solutions may be availed of to reduce overhead associated with managing an eventing system.

The builder module(s) 204 may be configured to consume from raw data 202, from the graph 100 and/or from other sources to determine vertices 102 and edge(s) 104 representative of the data and write to the data structure 300 of the data store 210. Generic functionality for mapping the builder module 204 and topic to schema and table can be shared across the builder modules 204, which may allow the implementation cost of supporting new modules 204 to be sustainable.

Each builder module(s) 204 may be configured to determine (which may include infer) edge(s) 104 and/or vertices 102 relating to a specific topic or theme. Each topic may be associated with one or more specific builder modules 104. In some embodiments, the respective builder module(s) 204 conforms to a specific schema, or event schema. The specific schema may require specific element types. Where a topic specific builder module 204 with a specific schema approach is taken (such as the write request/event being a triple), multiple builder module(s) 204 may be required to accommodate a single type of edge 104 that can join multiple types of vertices 104. In other words, there can be multiple builder modules 204 for a single type of edge, each using the edge for different vertices type pairs. For example, publishing 'same as' between two orgs, between two contacts and between one org and one contact would require three specific builder modules 204, one for each of: 'same orgs', 'same contacts' and 'same org and contact' topics. Similarly, where connections or edges 104 between more than two vertex types are to be determined at a time, a specific builder module 204 may be required for each pair of vertex types. For example, where the connection to be made is "user belongs to org that installed app", a first builder module 204 may be required to capture the vertices connected by first edge "user belongs to org" and a second builder module 204 may be required to capture the vertices connected by second edge "has installed app".

The one builder module 204 and one schema per topic approach tends to ensure a straightforward schema per topic. It allows for topic level access control for technologies using the data. It may provide control over (and for example restrict or limit) which builder module(s) 104 can write which data. In this way, data written to the graph data structure 100 may be vetted, reducing a risk to the overall quality of data in the graph data structure 100. The type (such as event type) of the schema (such as event schema) may be named as appropriate for the specific domain of the builder module 204, avoiding potentially confusing topic names which might otherwise occur were a per-edge type or a per-event/message type arrangement adopted, which cross builder module 204 boundaries. Furthermore, this approach can scale without affecting existing topics as new builder module(s) 204 are added and/or existing builder modules 204 start identifying or determining new connections. Despite possibly many topics, generic functionality for mapping the builder modules 204 and topic to schema and table may be shared across the builder modules 204. Multiple builder modules 204 may need access to the same topic tables, but all such builder modules 204 may share the same schema. The schema may be used across multiple topics, for example, for cases where different builder modules 204 publish the same event or transmit the same message.

Each builder module(s) 204 may be configured to determine (which may include infer) edge(s) 104 and/or vertices 102 relating to a specific topic, but with a generic schema, which accommodates elements of different types. For example, the edge type and the builder module(s) 204 topic may be "same as" to connect vertices that correspond with one another, where the vertices may be the same or different types of entities (e.g., Org Z is the same as Contact A, or Org Z is the same as Org X, or Contact A is the same as Contact B). In this embodiment, the schema may account for all permitted vertices types for the edge type and topic.

In some embodiments, a topic corresponds to an edge type, and the schema accommodates or accounts for all permitted vertices types for the edge type. In this embodiment, multiple builder modules 204 may be associated with the same topic, and may require access to the same topic tables in the data store 210. Accordingly, access controls may need to be implemented at the topic and event/message levels to mitigate against a builder module 204 attempting to write to a vertex table that it cannot, or should not.

In some embodiments, a topic corresponds to an edge type with a specific schema to accommodate a single type of vertices. For example, this arrangement would require separate topics for "same as" connections between organizations, between contacts, and between an organization and a contact. This results in a specific schema per topic, but may result in many topics. Multiple builder modules 204 may need access to the same topic tables, but all builder modules 204 share the same schema.

In some embodiments, all builder modules 204 are associated with one topic, and they share the same top-level structure. The vertices type in each write request event or message are checked against the respective publishing builder module's "write allowed" list. Access control at the topic level may not be possible.

Multiple builder modules 204 may be communicating write requests to the graph interface module 206 at the same time. This may result in contention between some builder modules 204 which may wish to write to the same tables (e.g., the write requests relate to common vertices and/or edges). To accommodate writes instigated by multiple builder modules 204 at the same or similar times, an appropriate level of isolation may be implemented during writes to the tables 302 of the data structure 300. In some embodiments, parallel write requests can be processed by the write interface 206A of the graph interface module 206. In such embodiments, for example, the tables 302 may be locked while a write request from a builder module 204 is being instigated by the write interface 206A. Once the write request has been completed, the table may be unlocked or released to facilitate a next write request being accomplished. In some embodiments, all builder module(s) 204 provide messages comprising write requests to a single pipeline, and the write interface 206A processes or consumes the messages one at a time, for example, in the order in which they are received along the pipeline (for example, the event stream). Stale writes may be avoided by the messages specifying data currency (or data freshness) and the graph interface module 206 only performing writes for current data, for example. For example, there may be a case where two different messages targeting the same vertices and edge are in the pipeline out of time order, i.e., "message b", which has a freshness stamp of later than "message a" may be provided to the write interface before message a. In that case, the write interface 206A may action "message a" by writing to the relevant tables of the graph 100 for the vertices and edge, but on receiving "message b" may note that the message is staler (or less fresh or new) than message a, and may therefore elect to not overwrite the vertices and edge tables.

Frequent individual writes by multiple builder modules 204 on overlapping tables 302 may be inefficient. For example, a consequence of requests consisting of a triple is that the types of vertices expected across topics may overlap; one with vertices A and B, one with A and C, B and C, etc. Again, multiple builder modules 204 may compete for write time against the same tables 302. In some embodiments, a builder module 204 or other separate merging module (not shown) may be responsible for merging write requests for a plurality or all topics into a single stream for providing to the graph interface module 204. For example, write requests may be batched by event type or message type before combining them into a single stream for processing and/or communicating them to the graph interface module 206 by a single builder module 204. For example, each builder module 204 may collate a certain number of write requests for their topic and submit the write requests to the write interface 206A of the graph interface module 204 as a batch. By linking topics to event types (e.g. event schemas) or message types, as per the one event schema per topic approach or the one builder module 204 and one event schema per topic approach discussed above, the builder modules 204 of those topics can collate or organize events in batches and provide the batch to the write interface 206A to perform batch writes against the corresponding tables. This may come at a small cost to data latency. However, the efficiency of this batching may be reduced by topics split by builder module 204 in addition to event type. Builder module(s) 204 may need to link records created as part of those batch writes.

The graph interface module 206 comprises the write interface 206A, the data store 210, and a read interface 206B. The write interface 206A of the graph interface module 206 is configured to map data (edges 104 and vertices 102) to the data store 210 in response to write requests including such data from the builder module(s) 204. The data store 210 may be a relational database, and may be configured to represent the graph data structure 100. Details of how the data store 210 may be configured to represent the graph data structure 100 in tables 302 are set out below with reference to FIG. 3.

In some embodiments, the graph interface module 206 does not confirm success of a write request from the builder module(s) 204; a 'fire and forget' interaction approach is taken. This tends to align well with offline and asynchronous interface patterns, which avoid backpressure for clients, such as the builder modules 204, and simplify interaction with the graph interface module 206.

The read interface 206B of the graph interface module 206 is further configured to communicate or cooperate with one or more service modules 208. The service module(s) 208 are configured to provide service or views based on or built on information derived from the graph. The service module(s) 208 may be configured to provide such views or services as a standalone service or view, or as part of a greater product. An example of a service provided by a service module(s) 208 is an application ("App") recommender service. An example of a product provided by a service module(s) 208 is a business register. Both of these use cases for the graph 100 are discussed in more detail below.

In some embodiments, there may be multiple service modules 208 using the same vertices 102 and/or edges 104 at the same time for providing or supporting services and/or products. In some embodiments, the service module(s) 208 request data from the read interface 206B of the graph interface module 206 in batches, although single record queries may be accommodated. An example request may be to provide to the service module 208 "all X's that have Y connection to Zs".

Figure 3:
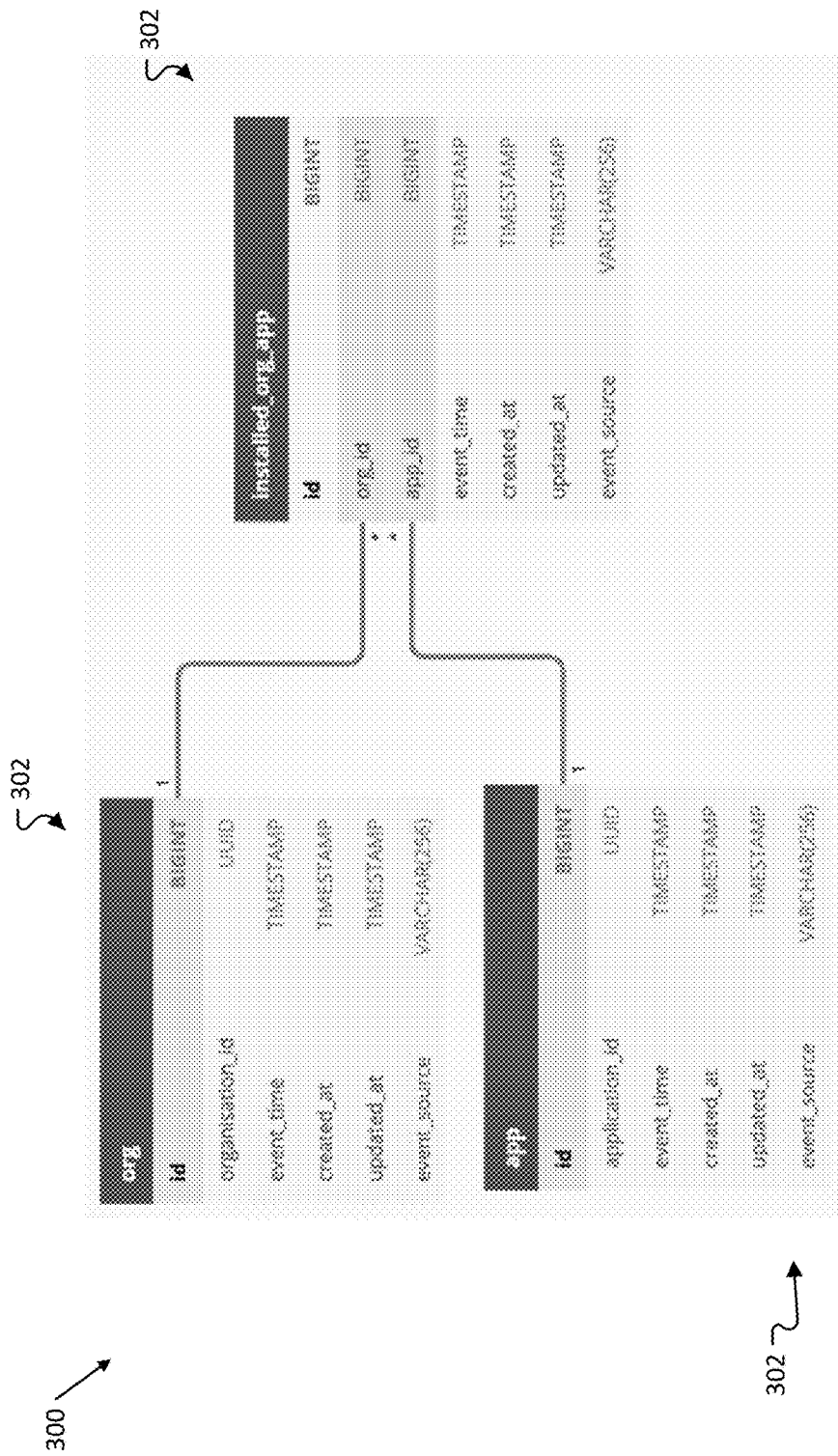
FIG. 3 is an example of a data structure comprising tables for an edge and vertices representing part of a graph data structure, according to some embodiments.

Referring now to FIG. 3, there is illustrated an example data structure 300 of the data store 210, which comprises a plurality of tables 302. The data structure 300 provides flexibility to the graph interface module 206, allowing for new concepts to be incorporated without requiring significant schema migrations for every change required, and supporting growth and change. As illustrated the data structure 300 comprises a table 302 for each respective vertex type and a table 302 for each respective edge type. In the example of FIG. 3, tables are shown for each of vertex "Org", vertex "App" and edge "Installed org app". The vertex table 302 holds a mapping between an identifier and an entity. For example, each entry in the vertex table "Org" has an identifier, which may be unique to the vertex table 302 "Org", or all vertex tables in the data structure 300. Similarly, each entry in the vertex table "App" has an identifier, which may be unique to the vertex table 302 "App", or all vertex tables in the data structure 300. The edge table 302 holds a mapping between one or more identifiers and a relationship. For example, each entry in the edge table 302 "API connection" includes an identifier, and the identifiers of the vertices connected by the edge, in this case, the identifier of the "Org" and the "App" in the vertex tables 302. Linking tables 302 based on shared identifiers or keys, in other words, performing a JOIN on these tables 302, allows for a full view of the dataset to be obtained.

Most read and write operations will only relate to a few node or edge types. Accordingly, by adopting this approach, those read and write operations will only require access to tables with the relevant data. In other words, data access is distributed, and accordingly, read and writes tend not to get bottlenecked. Furthermore, adding new vertex and/or new edge types will not impact existing schemas of tables. Having edges represented by separate tables 302 provides flexibility to have many different types of edge 104 attached to the same vertex 102. Additionally, an all-inclusive generic schema needn't be developed to accommodate all types of vertices 102 and/or edges 104. Instead, vertices 102 and edges 104 may have attributes relevant to their type, with clear meanings, rather than generic attributes used in different ways for different types. In some embodiments, the attributes selected for types of vertices and/or edges 104 may be derived with a view to the overall concept, as opposed to, for example, specific use cases for the data. Migrations are likely to affect more tables than were some other data structure models adopted, but these migrations can be done in a phased approach to avoid downtime. For example, changing the schema of a vertex table 302 could be done by first creating a new vertex table with the new schema, incrementally migrating the data over to the new table 302 and deprecating the old table 302.

In some embodiments, as vertices 102 and edges 104 have attributes specific to their type, the schema for each table of the data structure 300 may be different. Each table 302 may include one or more mandatory fields. For example, one or more of the following may be included as fields of the tables 302: (i) an identifier "ID", which may be unique within the table 302 for the vertex 102 or edge 104 type; (ii) created time, that is the time at which the table was created; (iii) updated time, that is the time the table was most recently updated; and/or (iv) a builder module identifier, which may have instigated the creation of the table, and/or may have updated the table 302; for example, the builder module identifier may be overwritten or updated as the table is edited or modified. In some embodiments, builder module(s) 204 may be required to populate all mandatory fields of a write request (such as an event data structure) for a vertex and/or edge. In some embodiments, write requests with missing information in mandatory fields may be requested, and/or not mapped to the relevant table of the graph data structure 100 by the graph interface module 206.

In embodiments where an entity represented by a vertex 102 corresponds to an object of the raw data (as distinct from an inferred object), an object identifier, "object ID" (for example, an organization ID or a contact ID), may be included as a field of the table 302 to link or map the table 302 and the entity represented by the table 302, to the object of the raw data 202, for example, as may be identifiable in a database 406 (FIG. 4) used by the accounting platform 404 (FIG. 4) to providing accounting services.

As an edge type may be used to connect different types of vertices 102, edges 104 may need to be able to identify the two vertices types they connect. For example, this may be achieved by including fields in the edge table for both vertex types, for example, the table name of the vertex type, and vertex ID. For example, a "same business" edge could connect two "contact" vertices, two "Org" vertices, or a "contact" vertex and an "Org" vertex, noting that both contacts and organizations may take the same role in many relationships. It will be appreciated that the edge table may not require a vertex type field, for example, where vertex IDs and edge IDs are unique across all of the tables of the data structure 300 and the graph data structure 100. However, it may nonetheless provide useful information.

FIG. 4 illustrates an example network or architecture 400 comprising a system 402 configured to generate, append to and/or use a graph data structure, according to some embodiments.

As illustrated, the architecture 400 may comprise an accounting system or platform 404 for managing accounts associated with a plurality of businesses or organizations. The accounting platform 404 may be connected to or otherwise access a database 406 configured to store or record data associated with accounting records and financial accounts of the organizations. In some embodiments, items of information stored in the database 406 may be referred to as objects, and may each be associated with an object id. Examples of objects that may be stored in the database 406 include organizations, contacts, apps, business type, employees, etc.

As depicted in FIG. 4, a plurality of servers and/or computing devices 408 associated with the plurality of organizations may be configured to communicate with the accounting platform 404 across communications network 410 to avail of the accounting services provided by the accounting platform 404. Similarly, a plurality of servers 412 may be configured to provide additional services to the accounting platform 404, for example to enhance or compliment the services provided by the accounting platform to the organizations, which may be customers (including individuals) of the accounting platform 404. For example, the servers 410 may be hosted by partners of the accounting platform 404, which may be pre-approved or vetted by the accounting platform 404.

The system 402 comprises one or more processors 414 and memory 416. The processor(s) 414 may include an integrated electronic circuit that performs the calculations such as a microprocessor, graphic processing unit, for example. Memory 416 may comprise both volatile and non-volatile memory for storing executable program code, or data. Memory 416 comprises program code (for example modules or engines) which when executed by the processor 414, provides the various computational capabilities and functionality of the system 402. The system 402 comprises a network interface 424 to facilitate communications with components of the system 402 across the communications network 410. The network interface 424 may comprise a combination of network interface hardware and network interface software suitable for establishing, maintaining and facilitating communication over a relevant communication channel.

In some embodiments, the system 404 may be implemented as a distributed system comprising multiple server systems configured to communicate over a network to provide the functionality of the system 402. For example, one or more of the program code (for example modules or engines) may be deployed on one or more disparate or remote servers, which may cooperate to provide the functionality of the system 402 described.

Memory 416 comprises one or more builder modules 204. The builder module(s) 204 are configured to determine connections or relationships between entities in raw data 202 to facilitate the construction and/or development of a graph data structure. The relationship is represented by an edge 104 of the graph data structure 100 and the entities are represented by vertices 102 interconnected by the edge 104.

The edge(s) and/or vertices may be determined directly, or identified, from the raw data 202. The edge(s) and/or vertices may be determined from information already stored in the graph 100, and/or from other external sources. The edge(s) and/or vertices may be determined by inference. Accordingly, in some embodiments, the builder module(s) 204 may comprise an inference engine 418 configured to infer one or more edges and/or vertices based on the raw data 202, data from the graph 100 and/or other data sources. The inference engine 418 may be configured to make inferences about a specific topic or theme. In some embodiments, one or more builder modules 204 may be configured to determine connections or associations between objects of a first type and objects of a second type. For example, the first and second object types may be different object types or the same object types.

For example, in some embodiments, one or more builder modules 204 may be configured to determine connections between organizations and apps being used by the organizations. The builder module(s) 204 may request or subscribe to receive application connection data, such as notifications or events indicative of app or API connection or call requests by organizations to connect to avail of services and/or products provided by servers 412 to the organizations using the accounting platform 404. In some embodiments, the builder module(s) 204 may request or fetch the application connection data, which may be maintained and stored in database 406.

In some embodiments, the builder module(s) 204 and/or the accounting system or platform 404 may be configured to monitor or track activity on the API of the servers 412. The builder module(s) 204 and/or accounting system 404 may be configured to track which organization is making a call to which API (or which service provided by server 412) and when. The builder module(s) 204 and/or accounting system 404 may be configured to track when an organization is making calls to an API of a server 412, how many calls the organization is making calls to the API of the server 412 and/or how regularly. Using this application connection information, the builder module(s) 204 (or the inference engine 418 of the builder module 204) may determine or infer that a particular organization has installed a particular app. In some embodiments, the builder module(s) 204 (or the inference engine 418 of the builder module 204) may determine or infer that a particular organization has uninstalled a particular app based on a lack of API calls over a period of time. Further details of a method 500 for generating application usage data using builder module(s) 204 is described below with reference to FIG. 5.

In some embodiments, one or more builder modules 204 are configured to determine connections, such as entity relationships, between organizations and contacts, and contacts and contacts, such as to determine where the contact entity is the same entity as the organization entity or another contact entity, or does business with the organization entity or another contact entity, for example. For example, the raw data 202 used by the system 402 may comprise contact and organization data. Each organization that uses or has an account with the accounting platform may have or maintain a contact list or contact address book. For example, the contacts in the contact list may be customers and/or suppliers of the organization. In some embodiments, the accounting platform 404 may maintain a contact table comprising details of at least some of the contact lists of organizations that have an account with the accounting platform 404. In some embodiments, the creation of a new contact entry in a contact list or address book, for example, by a user, and/or in response to the reconciling of a transaction between an organization and a contact using a recommended or suggested contact (which may be automatic), may instigate an instruction (e.g. a streamed event) to be sent to a builder module 204 to create an edge 104 between the organization and the contact. For example, the builder module 204 may be subscribed to receive events indicative of such actions or occurrences. Further details of a method 600 for generating connection or entity relationship data using builder module(s) 204 is described below with reference to FIG. 6.

Once an edge 104 between a pair of vertices 102 has been determined, the builder module 204 generates message (for example, an event) for transmitting to the write interface 206A of the graph interface module 206 for mapping the edge 104 and vertices 102 information to the relevant tables 302 of the data structure 300 in the data store 210. The message comprises information indicative of the edge and the vertex pair. In some embodiments, fields, such as "attributes" of the edge element may be populated or annotated with an indication of a strength of the determination or inference, contributing evidence, and/or dates/versions of inference.

The graph interface module 206 is configured to communicate or cooperate with one or more service modules 208 to provide services, views and/or products, for example to organizations or users of the accounting platform 204. The service module(s) 208 are configured to provide service or views based on or built on information derived from the graph 100. The read interface 206B of the graph interface module 206 is configured to receive read and process read requests received from the service module(s) 208 and to provide the required information to the service module(s) 208.

As illustrated, in some embodiments, the service module(s) 208 may comprise an app recommendation module 420. The app recommendation module 420 may be configured to generate recommendations, such as to organizations or users of the accounting platform 404, as to which apps they may be interested in installing. For example, the app recommendation module 420 may be configured to generate recommendations based on vertices 102 of a graph 100, 906 connected by "recommends" edges 104 as acquired from an app recommendation graph interface module 904 (FIG. 9), or from a relational database or a tabular data structure. For example, the "recommends" edges 104 between vertices 102 of different apps may be determined by an app recommendation builder module 902 configured to perform the method of FIG. 10, as discussed below. The app recommendation module 420 may be configured to determine that a user has an interest in a particular app, (for example, the user may have installed the particular app, or may be searching for a particular app), and based on the user's interest in that app, the app recommendation module 420 may request, from the graph 100, 906 a list of all (or any) apps linked or connected to that particular app by the "recommends" edge, for example, by performing method 1100 discussed below. Similarly, app recommendation module 420 may be configured to determine that a user has an interest in a particular app, (for example, the user may have installed the particular app, or may be searching for a particular app), and based on the user's interest in that app, the app recommendation module 420 may request, from the database, a list of all (or any) apps associated or linked to that particular app. For example, the app recommendation module 420 may recommend App 1 to Org Z because the app recommendation module determines that the user associated with Org Z was interested in App 2, and that App 1 and App 2 are connected in the graph 100 by edge "recommends", or associated in the relational database.

In some embodiments, the service module(s) 208 may comprise a business register module 422. For example, the business register module 422 may be configured to generate and maintain a business register based on vertices 102 of the graph 100 connected by "same entity" edges 104 as acquired from the graph interface module 206. The business register module 422 may be configured to receive a request for organization or contact details from a user, such as a user of the accounting platform 404 associated with a particular organization. The business register module 422 may be configured to send a read request to the read interface 206B of the graph interface module 206, the read request identifying an organization or contact as a vertex, and an associated relationship as an edge identifier (for example, "is associated with", "is the same as", "works at", "works for" etc.). The business register module 422 may be configured to receive a read response from the read interface 206B, the read response comprising one or more vertices recorded in the graph structure 100 as being connected to the provided vertex with the indicated edge type.

In some embodiments, the service module(s) 208 may comprise a correlation module 426. For example, the correlation module 426 may be configured to determine correlation data. The correlation data may be indicative of a correlation or a level of correlation between a first object of first object type and a second or other object(s) of the first object type. The first object type may be organizations, contacts, apps, business type, employees, etc. The correlation module 426 may infer correlation data from second object types joined or linked to first object types, for example, by an edge in a graph structure, to determine the correlation between a first object of first object type and a second object of the first object type. For example, the first object type may be a contact's business type and the second object type may be an organization. In such an example, the correlation module 426 may be configured to determine a level of correlation between a first business type and a second business type, for example, a renovation business and a decorator business. In some embodiments, the correlation module 426 may be further configured to make recommendations to a user based on the correlation data. For example, on determining that a user has stored, or has recently added, a renovation business as a service provider to its contact list, the correlation module 426 may recommend one or more decorator businesses to the user, on the basis that if the user has recently had some renovation work done, they may be interested in engaging a decorator.

Figure 5:
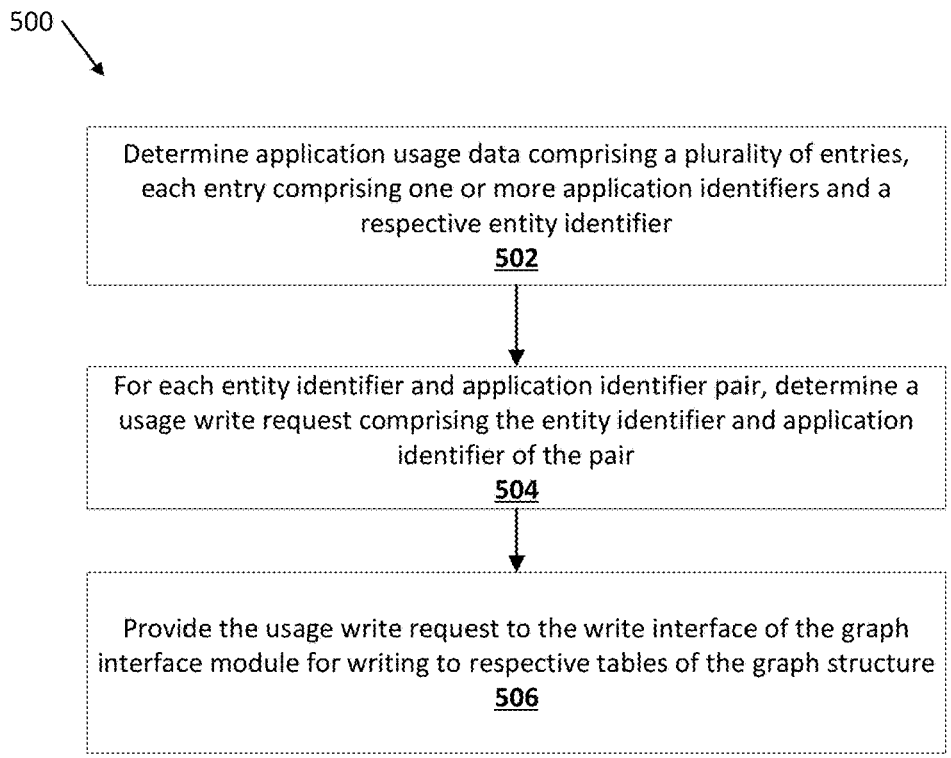
FIG. 5 is a process flow diagram of a method of generating application usage data for a graph data structure, according to some embodiments.

Referring now to FIG. 5, there is shown a process flow of the method 500 for generating application usage data for a graph data structure 100, according to some embodiments. For example, the method 500 may be implemented by the processor(s) 414 of the system 402 executing code (for example, one or more builder modules 204) stored in memory 416.

At 502, a builder module 204 determines application connection or usage data. The application connection data may comprise one or more entries. Each entry may comprise an entity identifier, such as an organization identifier, and an application ("app") identifier. The app identifier may identify an app provided by a service provider, or may identify the service provider that provides the app, for example. In some embodiments, the application data comprises a time stamp. The time stamp may be indicative of when a request, such as an API call, was made by the organization of the organization identifier to the service provider providing the app.

In some embodiments, the builder module 204 receives a message comprising application connection data when an organization makes a request to the app service provider, such as an API call. The builder module 204 may subscribe to receive event notifications of occurrences of API calls. For example, the builder module 204 may subscribe or "hook into" an event stream of an upstream data source associated with API calls. The event stream (such as a Kinesis stream) may comprise information about API connections, such as metadata about API usage, and may include data about organization and app provider pairs where there had been at least one API connection between the organization and app API within a given period of time, and for example, while the app provider was active.

In some embodiments, the builder module 204 requests or fetches application connection data on a periodic, regular, irregular or ad hoc basis, for example, from the database 406.

At 504, the builder module 204 determines vertices 102 and an edge 104 for each entry of the application connection data. The builder module 204 may be considered as configured to build or generate graph data having the topic or theme of "organizations that have apps installed". In some embodiments, an inference engine 418 of the builder module 204 is arranged to infer the vertices 102 and an edge 104 from the application connection data.

The edge 104 may represent an association or relationship between the vertices 102, such as "is connected" (i.e., the organization is connected to the app) or "has installed" (i.e., the organization is connected to the app). For example, the inference engine 418 may infer that a first vertex is an organization identifier, a second vertex is an app identifier, and the edge is "has installed". In some embodiments, the edge 104 may represent an interaction between the vertices, such as "last connection" (i.e. the last or most recent time the app made an API call on behalf of the organization). The connection app data may comprise additional information which may be recorded as attributes on the edge and/or vertices. For example, the edge 104 may comprise attribute information such as: "first connection date", "last connection date", "consent given", "consent revoked".

The builder module 204 (or the inference engine 418) is configured to infer usage of the app of the app identifier by the organization of the organization identifier by virtue of the fact that the organization has made a request or an API call to the service provider of the app. In some embodiments, where an entry of the application connection data comprises a timestamp, the builder module 204 may be configured to determine the freshness of the data and whether the connection should be made between the two vertices. For example, if the timestamp falls outside of a threshold period of time, such as more than one year ago, the builder module 204 may determine the entry as stale and may refuse, or not write, the data to the graph structure 100. In some embodiments, where an entry of the application connection data, or additional data source from the database, or a third party source, comprises an indication that the service provider of the app is no longer active, the builder module 204 may determine the entry as stale and may refuse, or not write, the data to the graph structure 100.

At 506, the builder module 204 provides the vertices 104 and edge 102 data inferred at 504 to the write interface 206A of the graph interface module 206 for writing to respective tables 302 of the graph structure 100.

Figure 6:
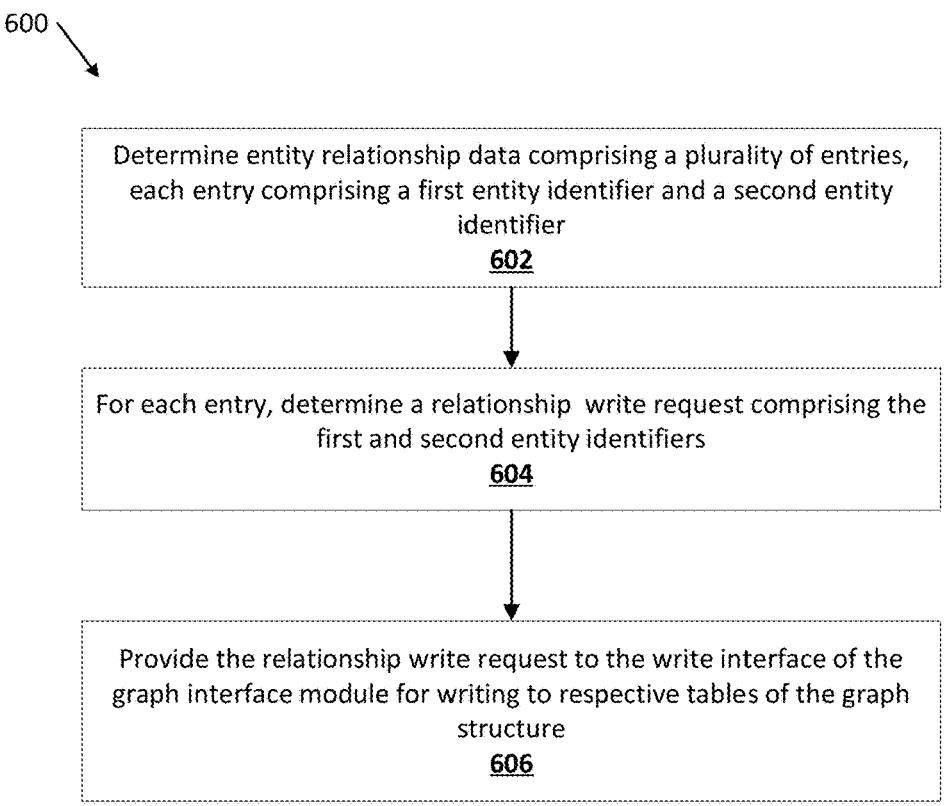
FIG. 6 is a process flow diagram of a method of generating entity relationship data for a graph data structure, according to some embodiments.

Referring now to FIG. 6, there is shown a process flow of the method 600 for generating entity relationship data for the graph data structure 100, according to some embodiments. For example, the method 600 may be implemented by the processor(s) 414 of the system 402 executing code (for example, one or more builder modules 204) stored in memory 416.

At 602, a builder module 204 determines entity relationship data. The entity relationship data may comprise one or more entries. Each entry may comprise a first entity identifier, such as an organization or contact identifier, and second entity identifier, such as an organization or contact identifier. In some embodiments, the entity relationship data comprises a time stamp. The time stamp may be indicative of when a relationship was established between the first and second entities of the entity identifiers.

In some embodiments, the builder module 204 receives a message comprising entity relationship data when an organization adds an entity to its contact list on the accounting platform, when an organization receives an invoice from the entity, when an accounting record of the organization is reconciled with a financial document associated with the entity, when the entity is recorded as an employee of the entity etc. For example, the builder module 204 may subscribe or "hook into" an event stream (such as a Kinesis stream) of an upstream data source associated with such data creation.

In some embodiments, the builder module 204 requests or fetches entity relationship data on a periodic, regular, irregular or ad hoc basis, for example, from the database 406.

At 604, the builder module 204 determines vertices 102 and an edge 104 for each entry of the entity relationship data. The builder module 204 may be considered as configured to build or generate graph data having the topic or theme of "is related to", "is the same as", "is an employer of", "is an employee of", "is a customer of", "is a supplier to", etc. In some embodiments, an inference engine 418 of the builder module 204 is arranged to infer the vertices 102 and an edge 104 from the entity relationship data.

The edge 104 may represent an association or relationship between the vertices 102, such as the above mentioned themes. For example, the inference engine 418 may infer that a first vertex is the first entity identifier, a second vertex is the second entity identifier, and the edge is "is the same as". In some embodiments, the edge 104 may represent an interaction between the vertices, such as "has done business with". The entity relationship data may comprise additional information which may be recorded as attributes on the edge and/or vertices. For example, the edge 104 may comprise attribute information such as: "first interaction date", "last interaction date".

The builder module 204 (or the inference engine 418) is configured to infer relationships between the first entity identifier and the second entity identifier from the entity relationship data. In some embodiments, where an entry of the entity relationship data comprises a timestamp, the builder module 204 may be configured to determine the freshness of the data and whether the connection should be made between the two vertices. For example, if the timestamp falls outside of a threshold period of time, such as more than one year ago, the builder module 204 may determine the entry as stale and may refuse, or not write, the data to the graph structure 100. In some embodiments, where an entry of the entity relationship data, or additional data source from the database, or a third party source, comprises an indication that the first or second entity is no longer active, in business, in existence, etc., the builder module 204 may determine the entry as stale and may refuse, or not write, the data to the graph structure 100.

At 606, the builder module 204 provides the vertices 104 and edge 102 data inferred at 604 to the write interface 206A of the graph interface module 206 for writing to respective tables 302 of the graph structure 100.

Figure 7:
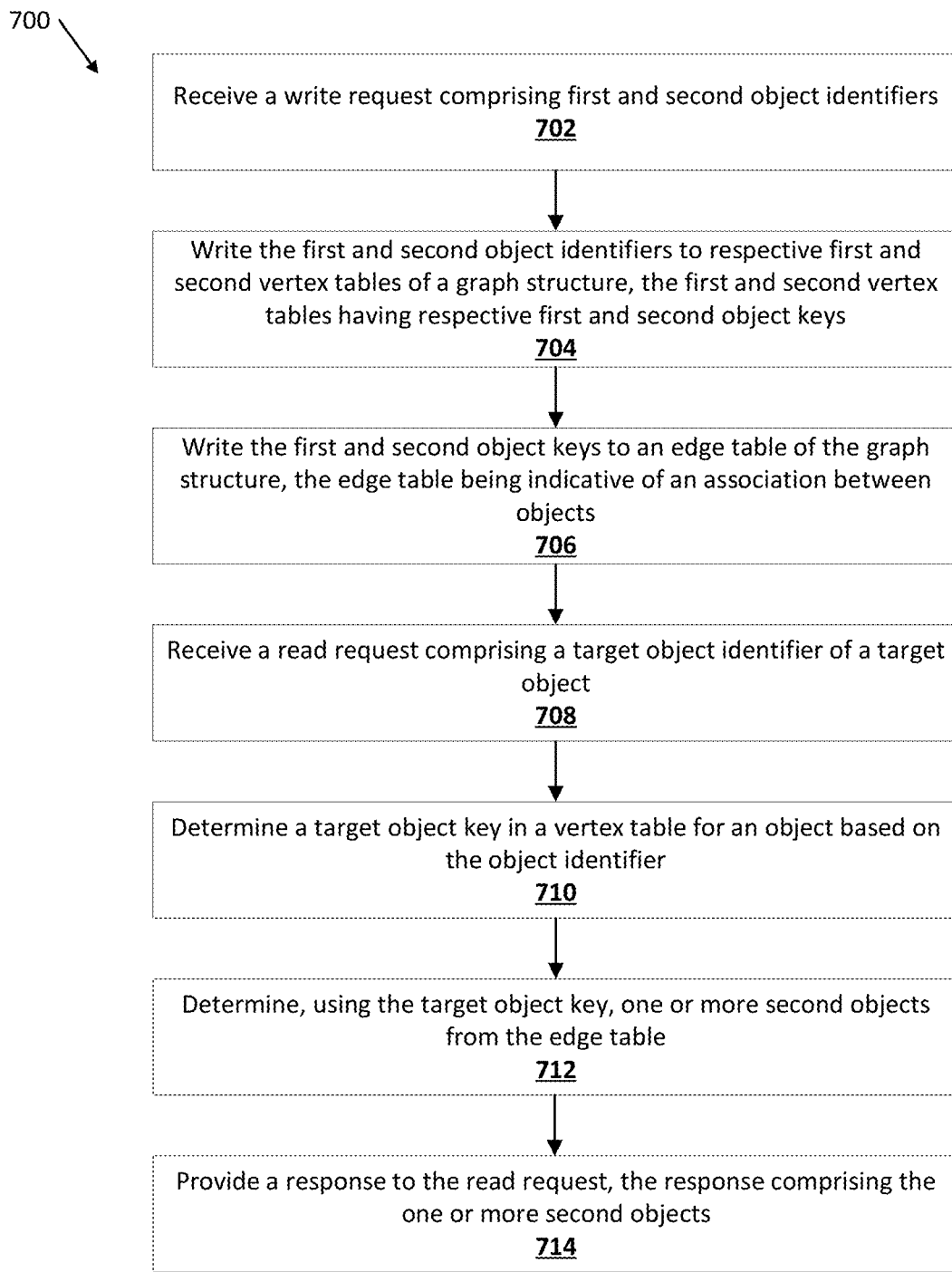
FIG. 7 is a process flow diagram of a method of writing data to a graph data structure and reading data from a graph data structure, according to some embodiments.

FIG. 7 is a process flow diagram of a method of writing data to a graph data structure and/or reading data from the graph data structure 300, according to some embodiments. The method 700 may be implemented by the processor(s) 414 of system 402 executing computer instructions stored in memory 416, such as the graph interface module 206.

In some embodiments, the method 700 may comprise writing data to a graph data structure 100.

At 702, the write interface 206A of the graph interface module 206 receives a write request comprising first and second object identifiers. The write request may be an association or relationship write request, an entity relationship write request, and/or an application connection write request, for example. The write request may be received from one or more builder modules 204 as discussed above. The write request may be received as a result of method 500 and/or method 600 described above.

At 704, the write interface 206A of the graph interface module 206 writes the first and second object identifiers to respective first and second vertex tables of the graph data structure 300. The first and second vertex tables may have respective first and second object keys.

At 706, the write interface 206A of the graph interface module 206 writes the first and second object keys to an edge table of the graph data structure 300. The edge table may be indicative of an association or relationship between objects.

In some embodiments, the method 700 may comprise reading data from the graph data structure 300.

At 708, the read interface 206B of the graph interface module 206 receives a read request comprising a target or candidate object identifier of a target or candidate object. For example, the object identifier may be an identifier of an object of an object type, such as an identifier of an organization. Alternatively, or in addition, the object identifier may be an identifier of an object type, such as organizations. In some embodiments, the read interface 206B may receive the read request from one or more service modules 208, such as the app recommendation module 420 and/or the business register module 422.

At 710, the read interface 206B determines a target or candidate object key in a vertex table for object(s) based on the object identifier(s).

At 712, the read interface 206B determines, using the target or candidate object key(s), one or more respective second objects from the edge table(s).

At 714, the read interface 206B provides a response to the read request. The response may comprise the one or more second objects. In some embodiments, the read interface 206B may provide the response to the one or more service modules 208, such as the app recommendation module 420 and/or the business register module 422.

In some embodiments, the read interface 206B may receive request for a set or subset of data associated with particular object types, as opposed to specific objects of an object type. For example, and as discussed below, the read interface 206B may receive a request for all apps joined to orgs using the edge "installed".

Figure 8:
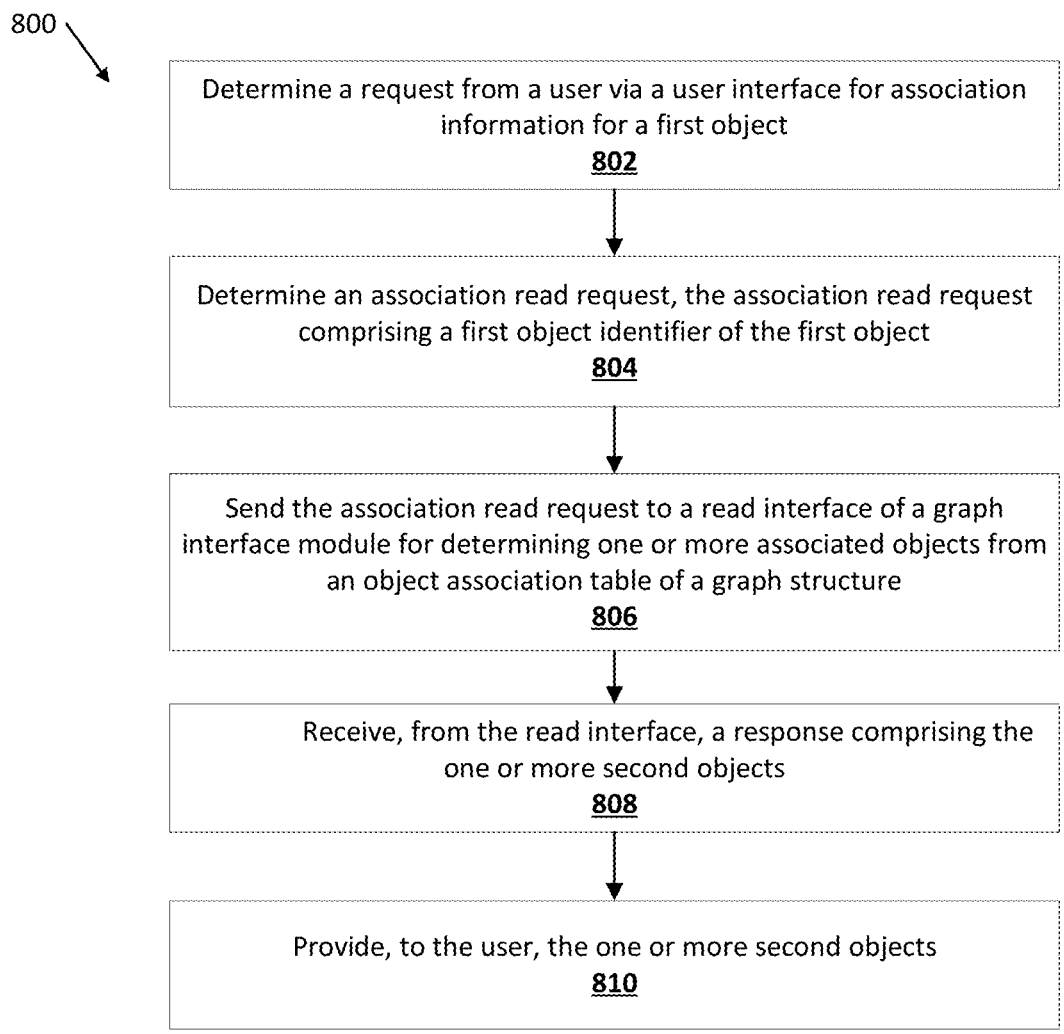
FIG. 8 is a process flow diagram of a method of determining object information from a graph data structure, according to some embodiments.

FIG. 8 is a process flow diagram of a method 800 of determining object information from a graph data structure, according to some embodiments. The method 800 may be implemented by the processor(s) 414 of system 402 executing computer instructions stored in memory 416, such as one or more of the service modules 208. In some embodiments, the method may be performed by the business register module 422 of the service module(s) 208.

At 802, the service module 208 may determine a request from a user via a user interface, for example, of the computing device 408, for association information for a first object. For example, the first object may be an organization or a person.

At 804, the service module 208 may determine or generate an association read request. The association read request may comprise a first object identifier of the first object. The association read request may specify the type of association required to be identified, such as a type of relationship, for example, employees of the first object, employer of the first object, contacts or entities that are the same as the first object, etc.

At 806, the service module 208 may send the association read request to a read interface 206B of a graph interface module 206 for determining the associated object(s) from an object association table of a graph structure 300.

At 808, the service module 208 may receive, from the read interface 206B of the graph interface module 206, a response comprising the one or more second objects.

At 810, the service module 208 may provide, to the user, the one or more second objects. For example, the service module 208 may provide the second object(s) to the user interface (not shown) of the computing device 408.

Figure 9:
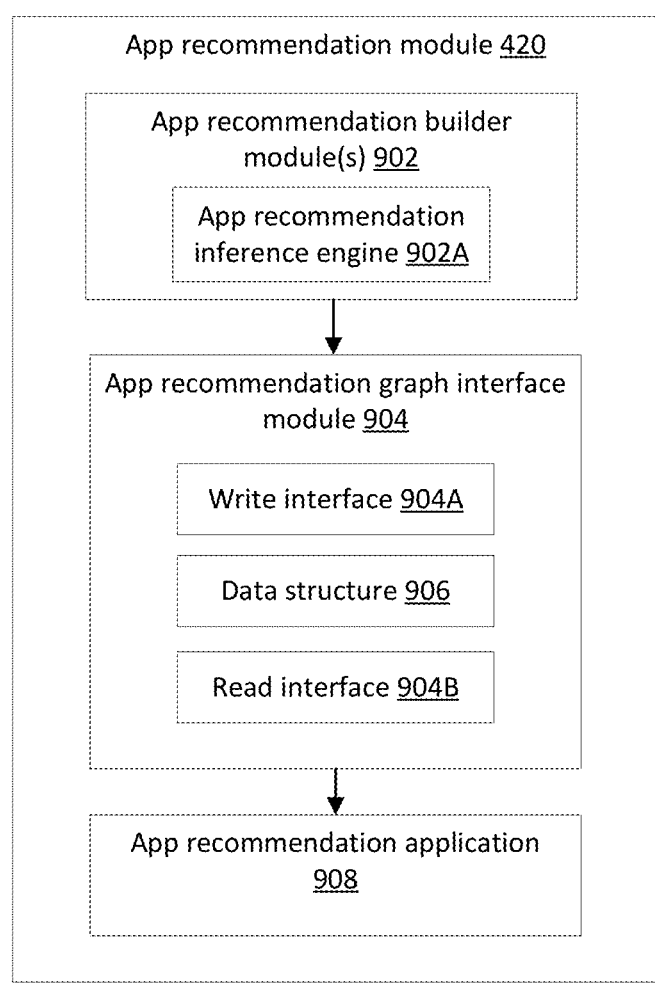
FIG. 9 is a block diagram of an application (app) recommendation module of the system of FIG. 4, according to some embodiments.

FIG. 9 is a block diagram of the app recommendation module 420 of the system 402 of FIG. 4, according to some embodiments.

As illustrated, the app recommendation module 420 may comprise one or more app recommendation builder modules 902. The recommendation builder modules 902 may comprise an app recommendation inference engine 902A.

The app recommendation builder module(s) 902 may be configured to perform in a similar manner to the builder module(s) 204 to generate write requests for an app recommendation graph interface module 904 of the app recommendation module 420. However, the app recommendation builder module(s) 902 may be specifically configured to generate or infer correlation data between pairs of apps, which may be based on data determined from the graph data structure 300, as discussed in more detail below with respect to method 1000 of FIG. 10.

The app recommendation module 420 may comprise an app recommendation graph interface module 904. The app recommendation graph interface module 904 may comprise a write interface 904A, a graph data structure 906 and a read interface 904B. The app recommendation graph interface module 904 may be functionally similar to the graph interface module 206. In some embodiments, however, the app recommendation graph interface module 904 may be replaced with an app recommendation database (not shown), such as a relational database or a tabular data structure.

The app recommendation module 420 may comprise an app recommendation application 908. The recommendation application 908 may be configured to determine application recommendations based on information in the graph data structure 906, or in the app recommendation database (not shown), as discussed below in more detail with reference to method 1100 of FIG. 11.

The processor(s) 414 of system 402 may execute computer instructions stored in memory 416, such as the app recommendation graph interface module 904 of the app recommendation module 420 to write data to the app recommendation graph data structure 906 (for example, using the write interface 904A) and/or read data from the app recommendation graph data structure 906 (for example, using the read interface 904B). In some embodiments, the method of doing so corresponds with that described above with respect to the graph interface module 206 of method 700. In that case, the write request may be a correlation write request, the first and second object identifiers of the write request may correspond with first and second application identifiers of an application pair, the edge table may be indicative of a correlation between, application, the read request may be an application recommendation read request, the read request may comprise a target application identifier of a target application, the response may be an application recommendation response, and/or the response may comprise one or more application recommendations. Similarly, processor(s) 414 of system 402 may execute computer instructions stored in memory 416, to write data to the app recommendation database (not shown), and/or read data to the database (not shown).

In some embodiments, the graph interface module 206 may comprise the app recommendation graph interface module 904. In some embodiments, the app recommendation graph interface module 904 may be the graph interface module 206.

Figure 10:
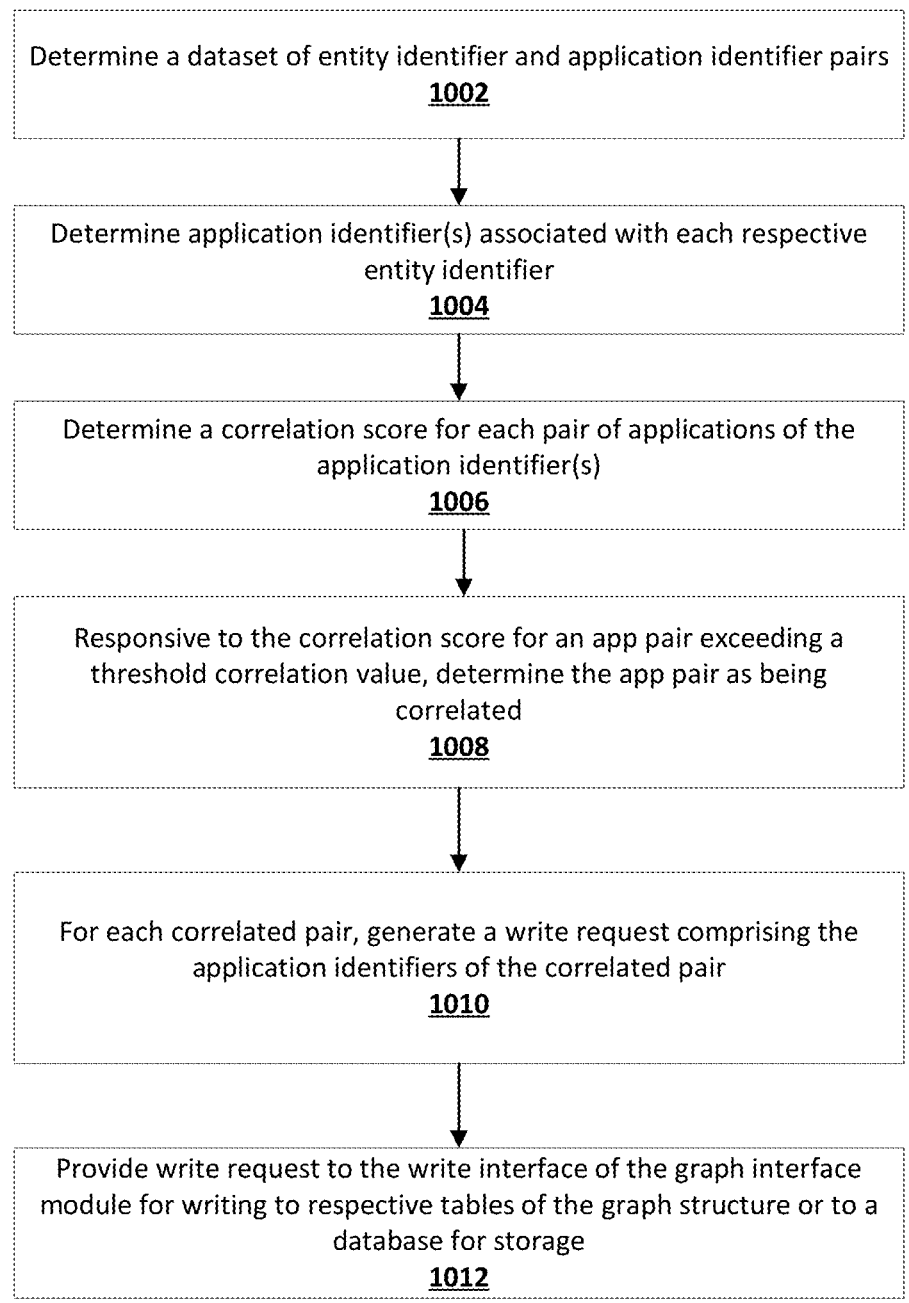
FIG. 10 is a process flow diagram of a method of generating correlation data for a graph data structure or relational database, according to some embodiments.

FIG. 10 is a process flow of the method 1000 for generating object type correlation data. The object type correlation data may comprise data indicative of a correlation between first object(s) of first object type and other object(s) of the first object type. For example, and as exemplified in the discussion below with respect to method 1000 of FIG. 10, the first object type may be applications, and the correlation data may comprise a first app and one or more other apps considered to be correlated with the first app.

The application correlation data may be stored in a graph structure, such as the graph data structure 906 of the app recommendation graph interface 904, according to some embodiments. In some embodiments, the correlation data may be stored in a database such as a relational database, for example, database 406 (FIG. 4). For example, the method 1000 may be implemented by the processor(s) 414 of the system 402 executing code (for example, app recommendation module 420) stored in memory 416.

At 1002, one or more app recommendation builder module(s) 902 determines a dataset of entity identifier and application identifier pairs. In some embodiments, the app recommendation module 902 determines the set of pairs from vertices 104 and edge 102 information stored in the graph data structure 300. In some embodiments, the app recommendation module 204 transmits a read request to the read interface 206B of the graph interface module 206 to obtain the dataset comprising the set of pairs. The dataset may comprise a list or group of organization identifiers, and the apps associated with each of the organization identifiers. For example, the association, as may be indicated by the edge joining or connecting the apps to the orgs may be "is installed by" or "has installed".

The dataset may comprise a list of entity identifiers (such as organization identifiers) and an app associated with each entity (for example, installed by the entity). For example, the dataset may comprise the following:

Org 1 App A

Org 2 App A

Org 3 App B

Org 4 App D

Org 3 App C

Org 1 App B

Org 3 App D

The app recommendation module 902 may be considered as configured to build or generate graph data having the topic or theme of "apps relatively highly correlated with other apps". For example, the app recommendation module 204 may be configured to consider two events (such as a specific organization having (or inferred to have) a first app installed (event one) and the specific organization having (or inferred to have) a second app installed (event two)) and determine whether the frequency of the two events co-occurring is different than would be expected from just the frequency of the individual events. In some embodiments, the app recommendation inference engine 902A of the app recommendation builder module 902 is arranged to infer the vertices 102 for the edge 104 "is relatively highly correlated with".

At 1004, the app recommendation builder module 902 determines a set of pairs of apps from the dataset. For example, the app recommendation builder module 902 may determine all possible pairs of apps from the dataset.

For example, the app recommendation builder module 902 may determine one or more apps relating to or associated with (for example, "installed by") each entity identifier. The apps relating to the entity identifiers may be collectively referred to as a set of apps. The app(s) relating to the respective entity identifiers may be determined from the dataset obtained at 1002. In some embodiments, the app recommender builder module 902 determines an array comprising a plurality of vectors, each vector representing one or more apps associated with the respective entity. The array may be a one-hot encoded list of the apps the respective entities are associated with.

An example of the array may be:

1, 1, 0, 0 ← org 1 has app a & b installed 1, 0, 0, 0 ← org 2 has app a installed 1, 0, 1, 0 ← org 3 has app a & c installed 0, 1, 0, 1 ← org 4 has app b & d installed This may be also depicted as shown in Table I below:

TABLE I

|  | App A | App B | App C | App D |
|---|---|---|---|---|
| Org 1 | 1 | 1 | 0 | 0 |
| Org 2 | 1 | 0 | 0 | 0 |
| Org 3 | 1 | 0 | 1 | 0 |
| Org 4 | 0 | 1 | 0 | 1 |

At 1006, the app recommendation builder module 902 (for example, the app recommendation inference engine 902A) determines a correlation score for each app pair of the application identifiers (i.e. of the set of apps). In some embodiments, the app recommendation inference engine 902A may be configured to receive as an input, a pair of app identifiers of a pair from the set of apps, and to determine, or provide as an output, a correlation score indicative of the correlation between the app pair.

In some embodiments, the app recommendation inference engine 902A of the app recommendation builder module 902 is configured to receive the array of apps and to provide as an output an array of correlation scores between pairs of apps. The array of correlation scores may be a 2-D numpty float symmetric array. An example of the array of correlation scores may be:

1.0, 0.6, 0.4, −0.4

0.6, 1.0, 0.2, 0.1

0.4, 0.2, 1.0, 0.3

−0.4, 0.1, 0.3, 1.0

This may be also depicted as shown in Table II below:

TABLE II

|  | App A | App B | App C | App D |
|---|---|---|---|---|
| APP A | 1.0 | 0.6 | 0.4 | −0.4 |
| App B | 0.6 | 1.0 | 0.2 | 0.1 |
| App C | 0.4 | 0.2 | 1.0 | 0.3 |
| App D | −0.4 | 0.1 | 0.3 | 1.0 |

In this example, column 1 represents app A, column 2 represents app B, column 3 represents app C and column 4 represents app D. Similarly, row 1 represents app A, row 2 represents app B, row 3 represents app C and row 4 represents app D. The diagonal line of 1.0's represents perfect correlation between an app and itself; row 2, column 1 represents the correlation between app A and app B; row 4, column 3 represents the correlation between app C and app D, etc.

In some embodiments, the correlation score is a pointwise mutual information score. For example, the app recommendation inference engine 902A of app recommendation builder module 902 may be configured to determine pointwise mutual information (PMI) about pairs of events (such as an organization having a first app installed, and a second app installed) to determine a value indicative of whether the frequency of the two events co-occurring is greater than the frequency of the individual events occurring. For example, the app recommendation inference engine 902A may use PMI to assess or determine a measure of the correlation (correlation score) between the two apps of each app pair. In other words, the correlation score may be, or may be based on the PMI of the app pair.

The PMI of a pair of outcomes x (e.g. a first app A being associated or installed by an organization) and y (e.g. a second app B being associated or installed by the organization) can be represented by the following equation:

$$pmi(x; y) = \log \frac{p(x, y)}{p(x)p(y)} = \log \frac{p(x|y)}{p(x)} = \log \frac{p(y|x)}{p(y)}$$

where p(x) is the probability of x occurring, p(y) is the probability of y occurring, p(x|y) is the probability of x occurring given that y occurs, and p(y|x) is the probability of y occurring given that x occurs. In other words, PMI is determined by dividing the joint probability by the estimated probability assuming independent events.

The independent probability of app A or app B being installed is the estimated probability. This is the number of times the respective app was installed divided by the total number of organizations. In some embodiments, the recommender builder module 902 may determine the independent probabilities of the apps installed, such as app A and app B, from the array comprising the plurality of vectors, as exemplified in Table I above. Each column of the array represents the orgs associated with a specific app. The independent probability of the respective app may be determined by summing the values of the associated column and dividing by the number of orgs. So, for example, taking the example of Table I above, the independent probability of app A is ¾.

The actual probability that both apps A and B are installed is the joint probability p(x, y). This is the number of organizations that have both apps installed, divided by the total number of organizations. If this is similar to the estimated probability that assumes independence, then it's likely that there is no relationship between the apps because the data is just as well described by assuming no relationship. If the joint probability is higher, a positive signal exists; i.e. app B tends to be installed alongside A. If it's lower, app B tends to not be installed if A is installed. The PMI, indicates whether the joint probability is higher, lower or approximately the same as the estimated probability. Accordingly, the more often apps A and B are both installed by organizations, the stronger the signal between those apps; the individual install distributions being equal (i.e., the install base for the apps overlaps more). The less often each app is installed by organizations, the more conspicuous it is that they were both installed by an organization; the joint install distribution being equal (i.e., because the apps have a smaller install base, the overlap is more notable).

In some embodiments, the recommender builder module 902 may determine the joint probabilities by transforming or converting the array comprising the plurality of vectors, as exemplified in Table I above into an apps×apps array. The apps×apps array may comprise an array of vectors, wherein each vectors represents app(s) of a set of apps associated with a particular app of the set. The apps×apps array may include a number of times each app was installed alongside each other app, as depicted in Table III below. The recommender builder module 902 may determine or construct this array by determining or counting a number of rows in each combination of columns of Table I where both cells contain a "1".

TABLE III

|       | App A | App B | App C | App D |
|-------|-------|-------|-------|-------|
| APP A | 3     | 1     | 1     | 0     |
| App B | 1     | 2     | 0     | 1     |
| App C | 1     | 0     | 1     | 0     |
| App D | 0     | 1     | 0     | 1     |

The recommender builder module 902 may then determine an array depicting the joint probability of each app combination (i.e. the joint probability array) by dividing each cell in the apps×apps array by the number of orgs. An example of the joint probability array determined from the array of Table I is depicted below as Table IV:

TABLE IV

|       | App A | App B | App C | App D |
|-------|-------|-------|-------|-------|
| APP A | ¾     | ¼     | ¼     | 0     |
| App B | ¼     | ½     | 0     | ¼     |
| App C | ¼     | 0     | ¼     | 0     |
| App D | 0     | ¼     | 0     | ¼     |

The recommender builder module. 902 may then use the values from Table III and the total number of orgs to determine correlations scores between pairs of app.

Accordingly, in some embodiments, for each app pair, the app recommendation inference engine 902A of the app recommendation builder module 902 may be configured to determine a number of organizations of the dataset with which a first app of the pair is associated (for example, has installed, or has been inferred to have installed the first app), a number of organizations of the dataset with which a second app of the pair is associated (for example, has installed, or has been inferred to have installed the second app), and a number of organizations of the dataset associated with both of the first and second apps. The app recommendation inference engine 902A may determine the PMI of each pair, and accordingly, the correlation score for each app pair based on this information.

The app recommendation inference engine 902A may normalize the score to provide a normalized correlation score. For example, the normalized output score may range from −1 to 1, where −1 indicates no co-occurrence (i.e., no organizations that have the first app also have the second app), 1 indicates perfect overlap (i.e., all organizations that have the first app also have the second app) and 0 indicates that the apps are independent (i.e. there is no difference between the events co-occurring or occurring individually).

At 1008, responsive to the correlation score for an app pair exceeding a threshold correlation value, the app recommendation builder module 902 determines the app pair as being correlated or sufficiently correlated with one another.

At 1010, for each correlated pair of applications, the app recommendation builder module 902 generates a write request comprising the application identifiers of the correlated pair. For example, the write request may comprise the app identifiers of the app pair as vertices of the edge representing the correlation, for example, an edge "recommends" or "is correlated".

At 1012, the app recommendation builder module 902 provides the write request to the write interface 904A of the app recommendation graph interface module 904 for writing to respective tables 302 of the graph structure 100, 906. According to some embodiments, app recommendation builder module 902 may additionally or alternatively provide write request for writing to a separate datastore outside the graph structure, such as to database 406 and/or an app recommender database.

An example dataset was examined using method 1000. The example dataset comprised data from 1,379,995 unique organizations, 915 unique apps, and 2,224,253 pairwise connections (i.e., app pairs). Of those organizations, 930,941 were connected to only one app. As such, it may seem that the data is too sparse to look for user-specific recommendations. However, 904 apps appear at least once with another app (i.e. 904 app pairs were associated with a same organization). It was found that 82 apps that had a PMI of at least 0.6 (a relatively strong correlation) with at least one other app. Following a manual inspection of the app pairs with a PMI of at least 0.6, the pairings were meaningful or reasonable, and included some that would not be found with word overlap.

Figure 11:
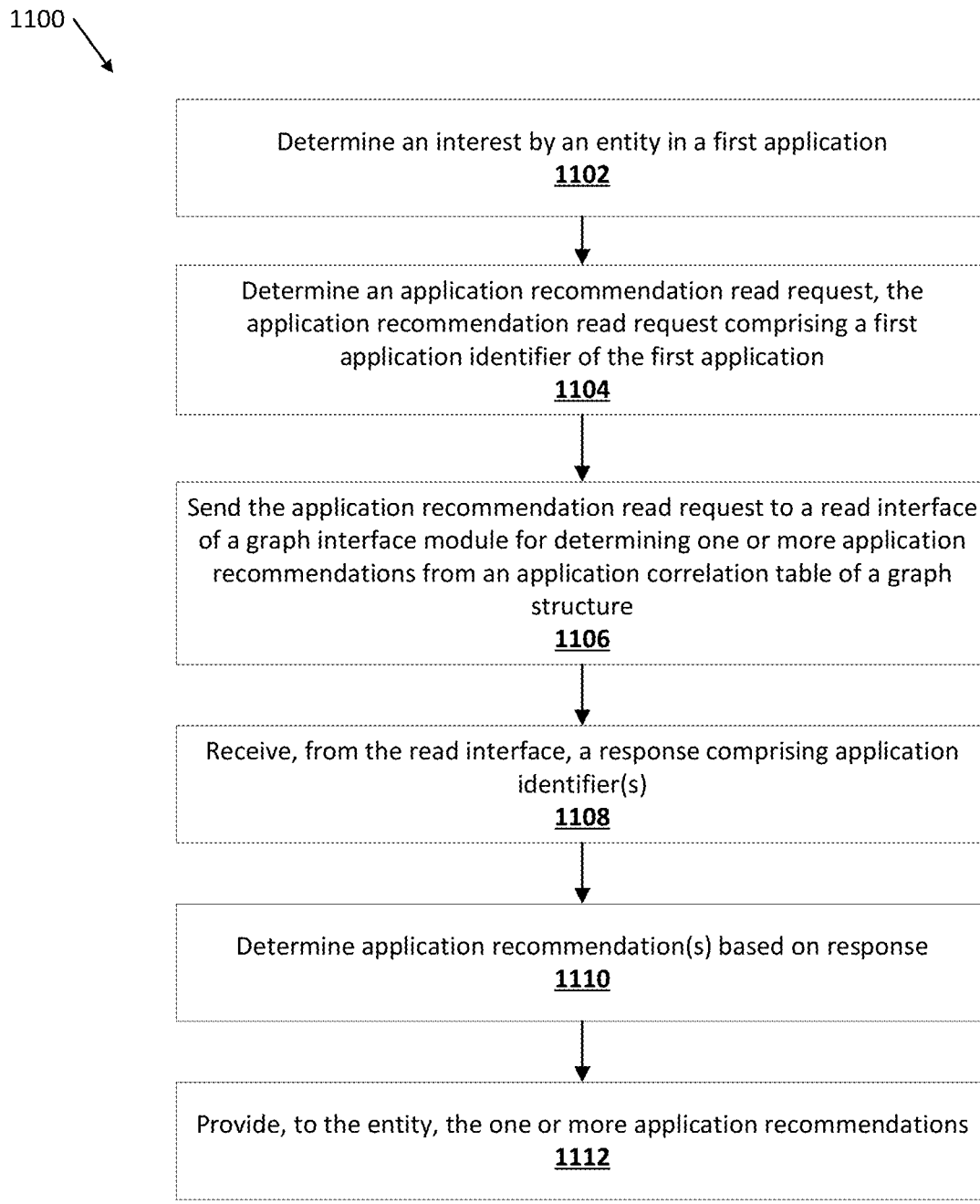
FIG. 11 is a process flow diagram of a method of determining application recommendations, according to some embodiments.

FIG. 11 is a method 1100 of determining application recommendations, according to some embodiments. The method 1100 may be implemented by the processor(s) 414 of system 402 executing computer instructions stored in memory 416, such as the app recommendation module 420 of the service module(s) 208, and in some embodiments, the app recommender application 908 of the app recommendation module 420.

At 1102, the app recommendation module 420 determines an interest by an entity in a first application. For example, the app recommendation module 420 may determine that the entity has searched for the first application, for example using a user interface within an accounting platform, or as an application provided by a service provider to the accounting platform. The app recommendation module 420 may determine that the entity has installed or used the particular app. For example, the app recommendation module 420 may be subscribed to receive details of organizations searching for apps or making API calls to app service providers, for example.

In some embodiments, the app recommendation module 420 may monitor search requests made by the user within an accounting platform provided by the system 400, and responsive to determining that a search request comprises a target application, the app recommendation module 420 may determine the target application as the first application.

In some embodiments, the app recommendation module 420 may monitor for a connection request by the entity to an application service provider providing a target application, and responsive to determining that a connection request is made, the app recommendation module 420 may determine the target application as the first application.

In some embodiments, the app recommendation module 420 may determine that the particular organization has an interest in a particular app by querying the read interface 206B of the graph structure interface 206 to read the relevant information from the graph 100, 300. For example, the app recommendation module 420 may transmit a read request comprising a request for one or more apps connected to the organization by an edge indicated of the organization having searched for the app, or having installed the app.

The app recommendation module 420 determines a second application to recommend to the particular organization based on the first application. For example, at 1104, the app recommendation module 420 determines an application recommendation read request. The application recommendation read request may comprise a first application identifier of the first application. The read request may include a vertex identifier, such as an identifier of the first app. The read request may include an edge identifier, for example, indicative of a correlation relationship between vertices, such as "recommends" or "is correlated with".

At 1106, the app recommendation module 420 sends the application recommendation read request to the read interface 904B of the app recommendation graph interface module 904 for determining application recommendation(s) from an application correlation table of the graph data structure 906 as, for example, may be determined according to method 1000. Alternatively, or in addition, the app recommendation module 420 sends the application recommendation read request to a database (e.g., app recommender database) storing the application identifiers of the plurality of correlated pairs of applications, as, for example, may be determined according to method 1000.

At 1108, the app recommendation module 420 receives, from the read interface 904B, or from the app recommender database, a response. The response may comprise one or more application identifiers. The response may include one or more vertex identifier. Each vertex identifier may be indicative of an app identifier, the app identifier being correlated with the vertex identifier of the read request.

At 1110, the app recommendation module 420 determines one or more app recommendations for the entity based on the response.

At 1112, the app recommendation module 420 provides, to the entity, the application recommendation(s). For example, the app recommendation module 420 may provide the application recommendation(s) to a user interface (not shown) of the computing device 408 associated with a user. The user may be associated with the entity or organization. The user interface may be a user interface provided by the accounting platform. In some embodiments, the output may take the form of an information statement such as "Organizations that use the app you just searched for have also use app X".

Figure 12:
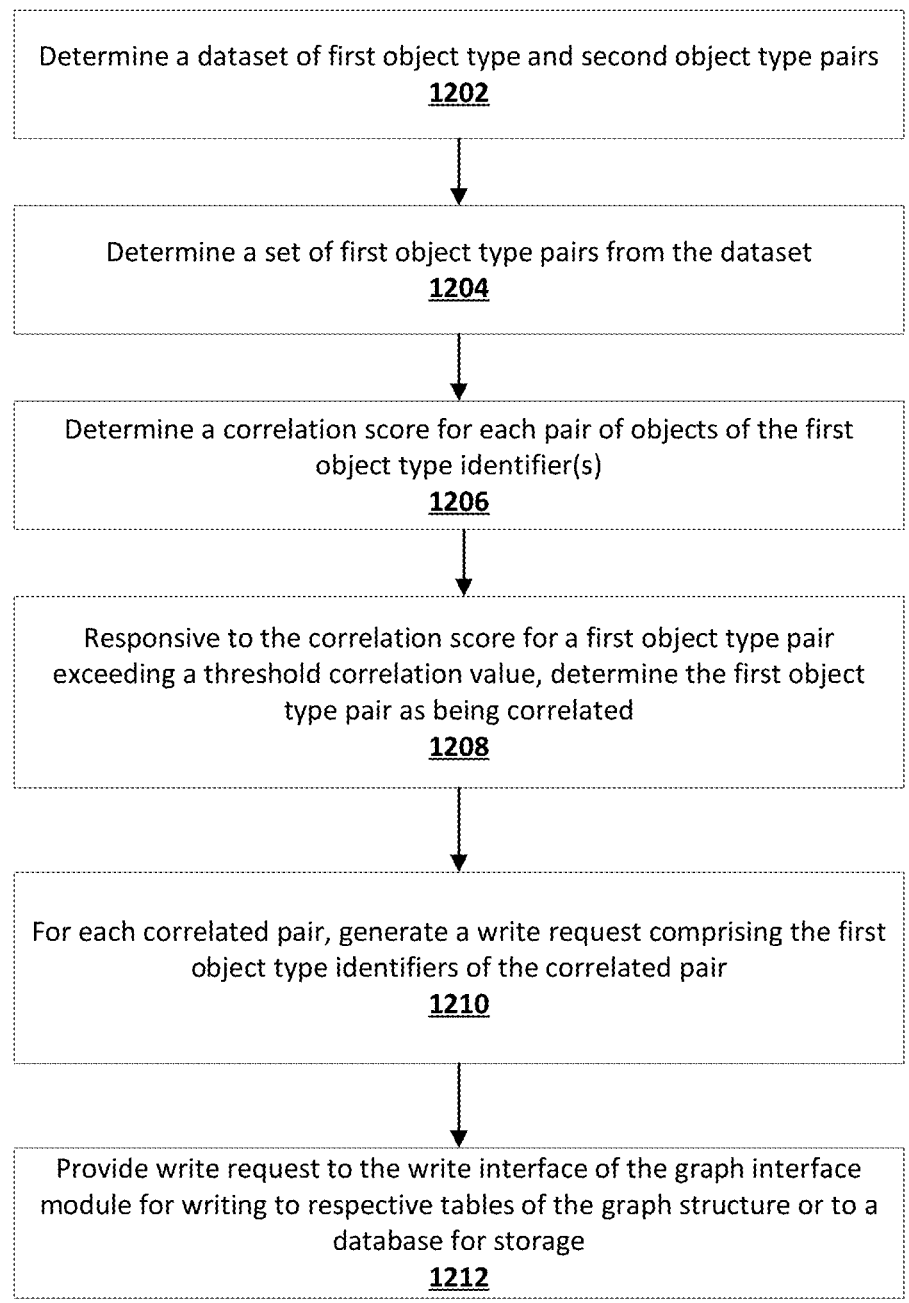
FIG. 12 is process flow diagram of a method of generating correlation data, according to some embodiments.

FIG. 12 is a process flow of a method 1200 for generating object type correlation data. The object type correlation data may comprise correlation score(s) for pairs of objects of a first object type. The correlation score of a pair may be indicative of a level of correlation between a first object of a first object type and a second object of the first object type. The object type correlation data may comprise a plurality of pairs of objects of a first object type considered to be correlated. The method 1200 may comprise using or relying on second object types joined or linked to first object types, for example, by an edge in a graph structure, to determine the correlation between a first object of first object type and a second object of the first object type. The first or second object types may be organizations, contacts, apps, business type, employees, etc. For example, and as exemplified in the discussion above with respect to method 1000 of FIG. 10, the first object type may be applications. For example, the first object type may be a contact's business type and the second object type may be an organization. In such an example, the method of 1200 may determine a correlation between a first business type and a second business type, for example, a renovation business and a decorator business.

The correlation module 426 may be considered as configured to build or generate correlation data for storing in a further graph structure or in a database, such as a relational database. The correlation module 426 may be configured to consider two events (such as a specific organization having (or inferred to have) a first business type contact in its contact list (event one) and the specific organization having (or inferred to have) a business type contact in its contact list (event two) and determine whether the frequency of the two events co-occurring is different than would be expected from just the frequency of the individual events. In some embodiments, the correlation module 426 is arranged to infer the relationship "is relatively highly correlated with", or in some embodiments to infer the vertices 102 for the edge 104 "is relatively highly correlated with".

As such, the correlation data determined according to method 1200 may be stored in a graph structure, or in a database, such as a relational database, for example, database 406 (FIG. 4). The method 1200 may be implemented by the processor(s) 414 of the system 402 executing code stored in memory 416.

At 1202, the system 402 determines a dataset of first object type and second object type pairs. For example, the first object type may be an organization identifier, and the second object type may be a type of business the organization is associated with, for example, has saved in its contact list.

At 1204, the system 402 determines a set of pairs of first object types from the dataset. For example, the system 402 may determine all possible pairs of first object types from the dataset.

In some embodiments, the system 402 determines first object type identifier(s) associated with each respective second object type identifier. For example, the correlation module 426 may determine a first array comprising a plurality of vectors, each vector representing one or more first object types associated with each respective second object type (e.g. a first array of second object types×first object types). The array may be a one-hot encoded list of the first object types the respective second object types are associated with. In some embodiments, the system 402 determines, from the first array, a second array of first object type×first object type. Each vector of the second array may represent a count or number for each object of the first object type representative of how connected or how associated each object is with a particular object of the first object type. For example, determining the second array from the first array may comprise determining from the first array and for each cell of the second array, a number of times the objects of the pair of the cell were associated with a common second object type in the first array. In other words, the cells of the second array may be populated with a count indicative of how many number of times the objects of the pair are joined or connected by one hop through a common object (i.e. an object common to the pair) of a different type. In other words, the counts is indicative of the number of times the objects of the pair are both connected to each other via an object of a different object type.

At 1206, the system 402 determines a correlation score for each pair of objects of the first object type(s). For example, the system 402 may determine a correlation score for each pair of objects of the second array. In some embodiments, for each pair of objects of the first object type, the system 402 determines, a number of objects of the second object type of the dataset with which a first object of the pair is associated, a number of objects of the second object type of the dataset with which a second object of the pair is associated and a number of objects of the second object type of the dataset with which both the first and second objects of the pair are associated. The system 402 may then determine the correlation score for each pair based on the respective first, second and third numbers for the pair.

In some embodiments, the correlation score is a pointwise mutual information (PMI) score. In some embodiments, the correlation module 426 determines the correlation scores for the pairs of first object types in a manner similar to or the same as that of step 1006 of method 1000 described above for apps.

In some embodiments, the system 402 determines the correlation score for a pair of first object types (for example, as represented by a cell of the second array) by determining independent probabilities of each of the first object types based on the first array, determining a joint probability for the pair and determining the correlation score based on the independent probabilities and the joint probability of the pair.

For example, the system 402 may determine the independent probability of an object of a first object type by determining a first amount indicative of the number of objects of the second object type the object of the first object type is associated with. The system 402 may determine the joint probability for a pair by determining a second amount indicative of the number of second object types that are associated with both first objects of the pair and dividing the second amount by the number of objects of the second type.

At 1208, responsive to the correlation score for a first object type pair exceeding a threshold correlation value, the system 402 determines the first object type pair as being correlated.

At 1210, for each correlated pair, the system 402 may generate a write request comprising the first object type identifiers of the correlated pair. In some embodiments, a batch of correlated pairs may be written to the relevant data storage.

At 1212, the system 402 may provide the write request to the write interface of the graph interface module for writing to respective tables of the graph structure or to a database for storage.

Figure 13:
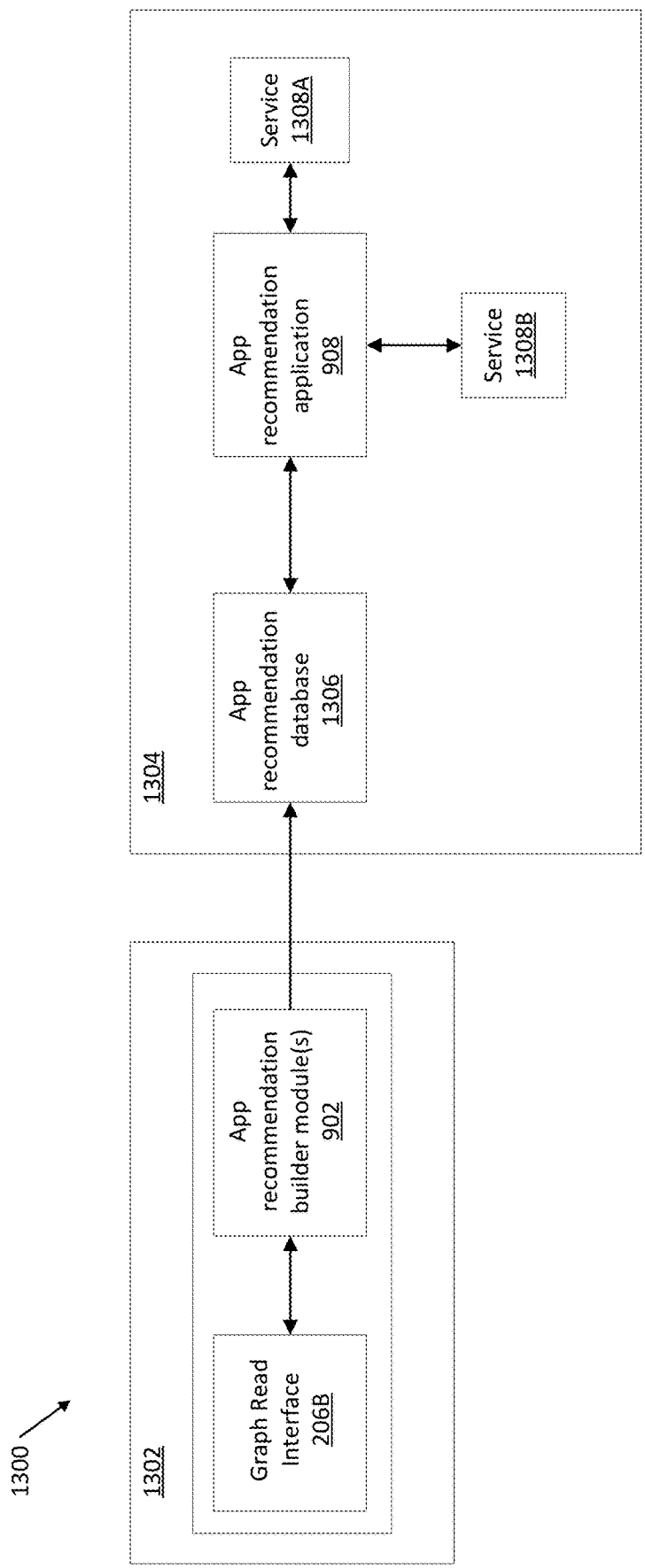
FIG. 13 is an example schematic of the deployment of the application recommendation module, according to some embodiments.

Referring now to FIG. 13, there is shown an example schematic 1300 of the deployment of the application recommendation module 420, according to some embodiments. The schematic depicts a research lab or internal environment 1302 and an external environment such as a Product as a Service (PaaS) Product environment 1304. It will be appreciated that a similar architecture could be used for deploying other service modules, such as the business register module 422 and/or the correlation module 426.

The graph read interface 206B and the app recommendation builder module 902 are shown as being deployed within the internal environment, for example, on one or more servers of the system 402. As previously described, the app recommendation builder module 902, which may comprise the app recommendation inference engine 902A, may be configured to determine or fetch a dataset of entity identifier and application identifier pairs from the graph read interface 206B. In some embodiments, the app recommendation builder module 902 determines the set of pairs from vertices 104 and edge 102 information stored in the graph data structure 300. The dataset may comprise a list or group of organization identifiers, and the apps associated with each of the organization identifiers.

The app recommendation or app recommender database 1306, the app recommendation application 908 and a plurality of services, service 1308A and service 1308B, are shown as being deployed within the external environment, for example, on one or more servers of the system 402. For example, the app recommendation database 1306 may be an Amazon DynamoDB table. The app recommendation database 1306 is configured to receive information, such as written recommendations, from the app recommendation builder module 902. For example, the information may comprise one or more pairs of correlated applications. The app recommendation application 908 determines an interest in first application(s) for one or more services 1308A, 1308B and the app recommendation application 908 determines or fetches suitable second application recommendation(s) from the app recommendation database 1306 and provides the recommendation(s) to the service(s) 1308A, 1308B.

Figure 14B:
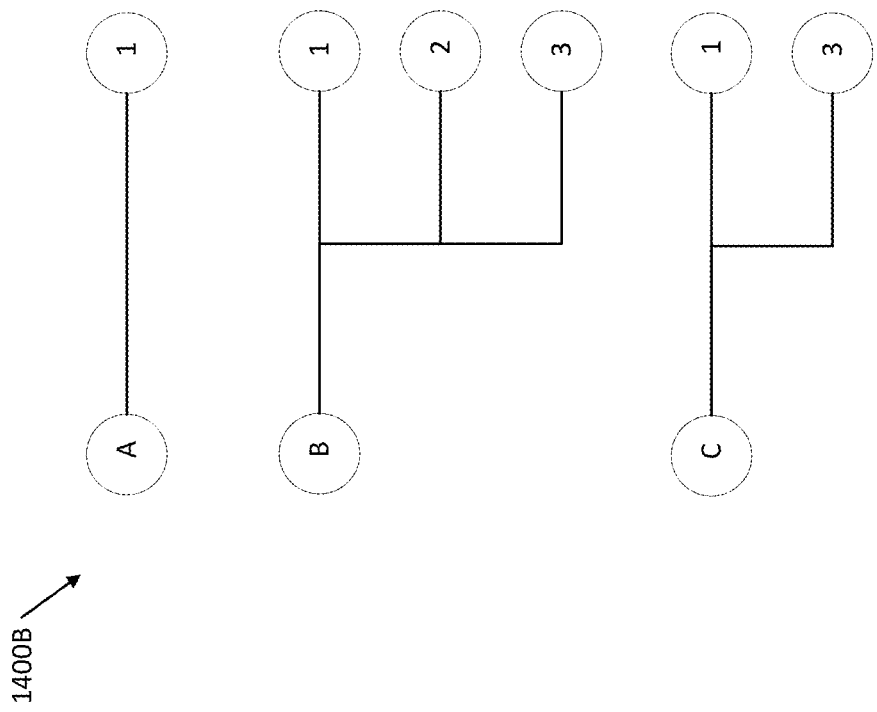
FIG. 14B is a logical representation of the relationship between objects of the first and second object types of FIG. 14A.
Figure 14A:
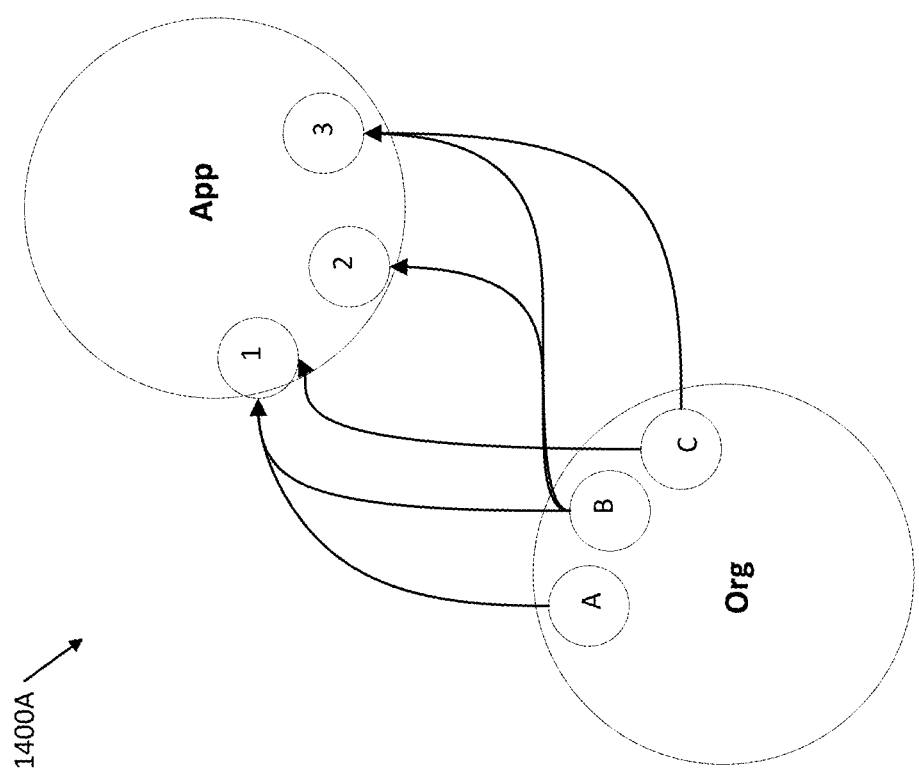
FIG. 14A is schematic logical representation of vertices of a first object type and vertices of a second object type linked edges.

Referring now to FIGS. 14A and 14B. FIG. 14A shows a schematic logical representation 1400A of nodes or vertices of a first object type (in this example, apps) 1402, and nodes or vertices of a second object type (in this example, orgs) 1404, linked or joined by edges 1404 (in this example, "installed"). As shown, App 1 is linked to each of Org A, Org B and Org C, App 2 is linked to Org B, and App 3 is linked to Org B and Org C. This is a depiction of how this information may be stored (at least conceptually) in the graph structure 300, for example.

A logical representation of the relationship between objects of the first and second object types is depicted in FIG. 14B. In some embodiments, a builder module, such as the app recommendation builder module 902, may determine this information—i.e. one or more apps relating to or associated with (for example, "installed by") each entity/org identifier—from the graph structure 300. For example, similar information may be retrieved by the app recommendation builder module 902 in performing step 1002 of method 1000, and/or correlation module 426 in performing step 1202 of method 1200.

An example pseudo query which may be provided by the builder module to the read interface 206B to fetch this information from the graph 300 may be represented as:

```
query {
orgs {
orgId
installed { appId
} } }
```

Using this information, the builder module, such as app recommendation builder module 902, may be configured to determine a second object type×first object type table (e.g., org×app table), such as the example shown above in Table 1.

In some embodiments, in constructing the second object type×first object type table (e.g. org×app table), the builder module ensures that: 1) there is a cell in the row of the table for each known first object type, and not just those associated or linked to the respective second object type; 2) that all cells of the table share a same index across all second object types corresponding to the same first object type; and 3) that the cell contains 'zero' if the corresponding first object type is not associated or linked to the respective second object type.

However, in some embodiments, where a number of second object types is excessive, for example, greater than a threshold, the generation of a suitable second object type×first object type table can be relatively slow and can require relatively large memory. For example, assume there are 915,000 objects of the second object type, and 28,000 objects of the first object type stored in the graph structure 300. If collection endpoints of the read interface 206B are paginated with a page size of 1,000, the builder module needs to fetch from the read interface 206B 915 times to collect all of the data. And memory needs capacity for a table with 915,000×28,000 cells. It is expected that it would take the read interface 206B about 6 hours and 200 GB of memory to retrieve all of the data to populate the second object type×first object type table from the graph structure 300.

However, in some embodiments, the second object type data (for example, the org data) is not actually used. For example, this is the case where the correlation scores are determined based on PMI scores. Accordingly, in some embodiments, a modified read request or query may be provided to the read interface 206B that reduces the overall amount of data being fetched from the graph structure 300 and provided to the builder module. This can be achieved by the read interface 206B using the second object type data for traversal within the graph structure 300, but not actually retrieving the second object type data itself. For example, the modified read request or query may comprise a request for objects of first object types associated with or joined to other objects of first object types. That is, for each candidate object of the first object type, all other objects of the first type that are associated or joined to the candidate object via a second object type, and wherein the join or edge is a particular edge type, such as "installed". The modified query may be in the form of: "Node A Node A".

An example pseudo modified query which may be provided by the builder module to the read interface 206B to fetch this information from the graph 300 may be represented as:

```
query {
apps {
appId
installed { //org with app with ID appId installed
//orgId - field not required
installed { //apps installed by org
appId // apps installed alongside app with ID appId (including itself)
} } } }
```

Figure 15:
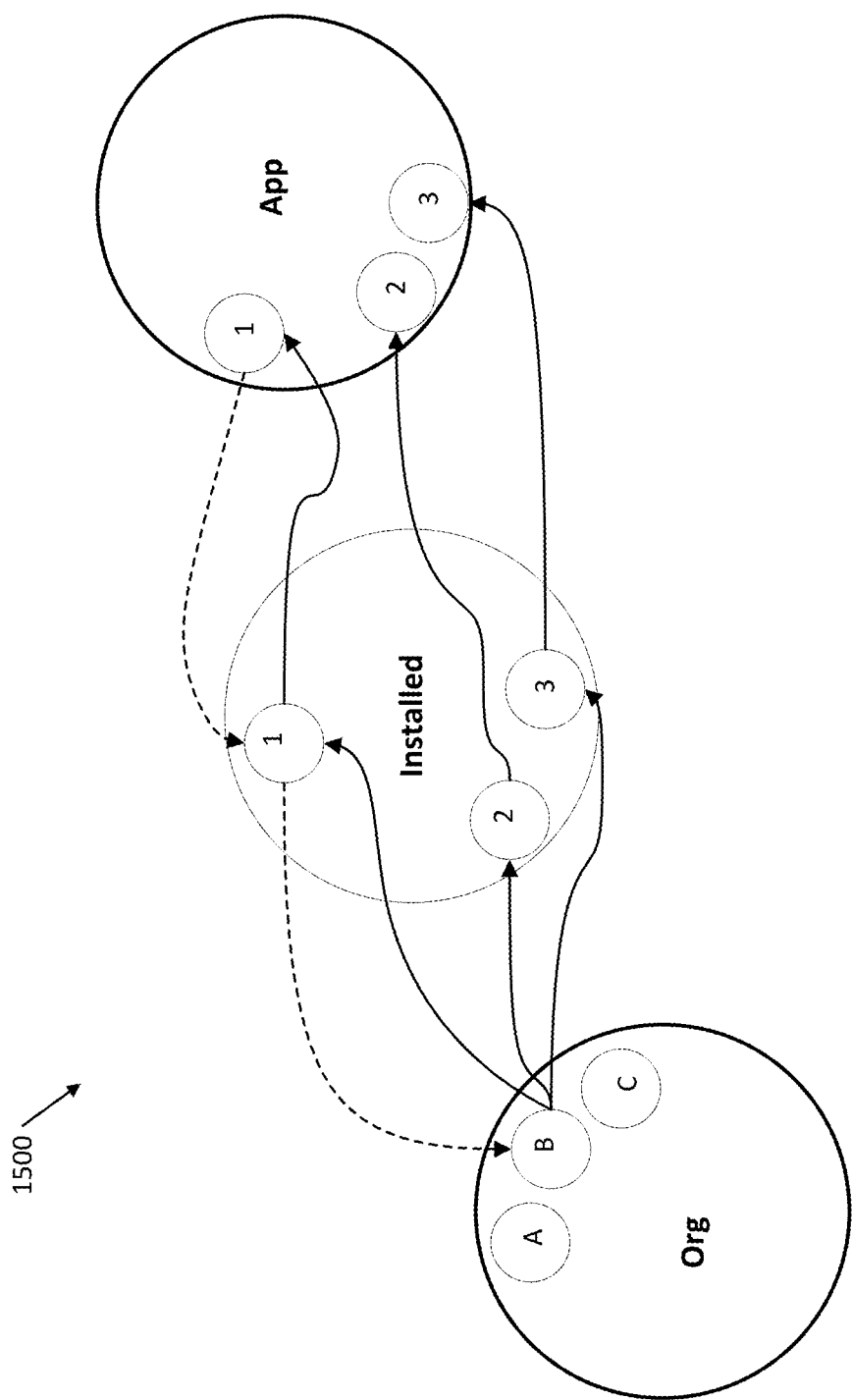
FIG. 15 is an example schematic of a path followed by a graph read interface in executing a modified query in the form of: "Node A Node A".

An example schematic 1500 of the path followed by the read interface 206B in executing or acting on the modified query is illustrated in FIG. 15. The "installed" node of FIG. 15 is effectively a join table for the Org and App instances. In response to receiving the modified request, for each candidate object of the first object type, the read interface 206B is configured to follow the particular edge type to determine all of the objects of the second object type associated with the candidate object (dashed lined path in FIG. 15), and to follow the same particular edge from those objects of the second object type to determine the objects of the first object type associated with them (sold lined paths in FIG. 15). In the example of FIG. 15, candidate App 1 is associated with Org B by the edge "installed". Org B is associated with Apps 1, 2 and 3 by the edge "installed".

The data provided by the read interface 206B in response to receiving the modified query may be a first dataset. The first dataset may comprise a list of objects of the first object type and for each object, a set of objects of the first object type associated with the each object, and optionally, an object of the second object type associated with each object of the set. An example of the output for the graph 300 of FIG. 14A is shown below in Table V:

TABLE V

|  | ORG A | ORG B | Org B | Org B | Org C | Org C |
| --- | --- | --- | --- | --- | --- | --- |
| App 1: | App 1 | App 1 | App 2 | App 3 | App 1 | App 3 |
| App 2: |  | App 1 | App 2 | App 3 |  |  |
| App 3: |  | App 1 | App 2 | App 3 | App 1 | App 3 |

On receiving this information, the builder module may construct the first object type×first object type table (e.g. the app×app table), similar to that of Table III above. For example, the builder module may determine a count for each object of the first object type associated with the candidate object, and populate the relevant cell of the first object type×first object type table with the total count.

Although the output provided by the read interface module 206B may involve some redundancy and in some cases, much redundancy, only a simple graph schema exposing underlying nodes or vertices is required, which reduces the complexity of the graph read interface 206B and the builder module.

However, in some cases, some objects of the first object type are associated with a relatively large number of objects of the second object type. This means that when executing the modified query, the read interface 206B fetches all of the objects of the second object type (e.g. orgs) that are associated with a common object of the first object type (e.g. a common app) to access the objects of the first object type associated with those objects of the second object type.

This issue may be difficult to avoid without adding complexity to how the data is represented and accessed in the GraphQL service, as the data access model of the data query language GraphQL involves individually fetching fields of objects. Unfortunately, the flexibility of the relatively simple graph read interface GraphQL schema conflicts with the potential volumes of data involved and the potential in the graph structure 300 for relatively extreme branching with even slightly complicated queries, such as App→Installed→Org→Installed→App. In some embodiments, the modifier query causes requests to time out as soon as a popular app was encountered.

In some embodiments, data loaders may be used to offset or mitigate issues with services provided by service modules 208 slowing down due to excessive data access needs. Data loaders may combine what would be individual record or data fetches or requests into batch fetches or requests, reducing traffic between the service module(s) 208 and data store 300, 406 and taking advantage of batch read performance in the data store. Data loaders may maintain an in-memory cache of fetched data to avoid traffic from repeated data access. However, in some situations, data loaders may not effectively mitigate the potential branching problem. For example, there may simply be too many objects of second object types (e.g. orgs) that are associated with (e.g. have installed) certain objects of first object types (e.g. certain apps), and any gain from using data loaders may not be effective in overcoming the cost.

In some embodiments, paging of an inner collection during a query may be enabled. This would enable the user to page through the top-level apps collection as well as the installed orgs collection within each app. However, nested paging can be clunky for users. It would also involve significant work to support it in the graph read interface involving integration across the query schema (e.g. GraphQL schema) and resolvers. It may also not reduce the amount of data that would need to be served to and processed by the user.

Another strategy for optimizing the query is to shift the heaviest part of the query out of the query engine in the graph read interface 206B and into the data store or database where the data is stored, such as the data structure 300 of the graph interface module 206, for example. In some embodiments, the data structure 300 is capable of efficiently executing queries with a relatively high branching factor across a relatively small number of tables. For example, the data structure 300 may be or comprise a PostgreSQL data store such as Amazon Web Services (AWS) Aurora PostgreSQL data store.

This optimization strategy may be achieved by further modifying the read request or query such that it relies on graph traversal and depends only on the abstractions within the graph 300. Advantageously, this allows the functionality to be exposed from the read interface 306B in such a way that it is not specific to the use case(s) of the service module(s) 208, which may reduce the generality of the read interface 306B and/or which may make supporting it for future needs more complicated.

The further modified query is in the form of: "Node A Node A (with count)". The read interface 306B is caused to query the nodes that are connected to nodes of the same type by an edge. In the context of "App Installed Org Installed App", this is the apps that are connected to each other via orgs. Any such pair are apps that are both installed by the same organization. As the org is only accessed to access its installed apps, it need not actually be fetched. But the number of edges joining two apps is determined, and is provided as an output or returned to the services module 208. As explained above, for the app recommendation module 420, the number of edges joining two apps is needed to calculate joint probability. The joint probability would be the number of edges joining two apps divided by the overall number of apps.

Accordingly, the original query, which was in the form of "Node A Edge×Node B Edge×Node A" reduces to "Node A Node A (with count)".

The optimization may be expressed as a siblings field on vertices or nodes or edges in the graph data structure 300. The siblings field of a particular node or edge may be populated with a count. The count may be a value indicative of a number of other nodes of a same type joined by one hop from the particular node. The count may be indicative of a number of paths between an object pair via a particular node type and a particular edge type. The count may be indicative of a number of different objects of a second object type both objects of the pair are connected to via a particular edge type. The siblings field may be populated with pairs of object identifiers of a first object type, and associated counts. When the siblings field is a field of a particular node, the siblings field may be populated with one or more object identifiers of a same type as the particular node, and for each object identifier, the associated count of it and the particular node. In some embodiments, the graph data structure 300 is configured to populate one or more siblings fields in response to receiving, and in some embodiments, processing or acting on, a transformed query from the read interface 206B, as discussed in more detail below with reference to method 2000 and FIG. 20.

An example pseudo further modified query which may be provided to the read interface 206B to fetch information in the form "Node A Node A (with count)" from the graph 300 may be represented as:

```
query {
  apps {
    appId,
    siblings {
      appId,
      count
    } } }
```

Using the example of FIGS. 14A and 14B, the output from the read interface in response to the further modified query in the form of: "Node A Node A (with count)" is visualized in the schematic 1600 of FIG. 16.

Figure 17:
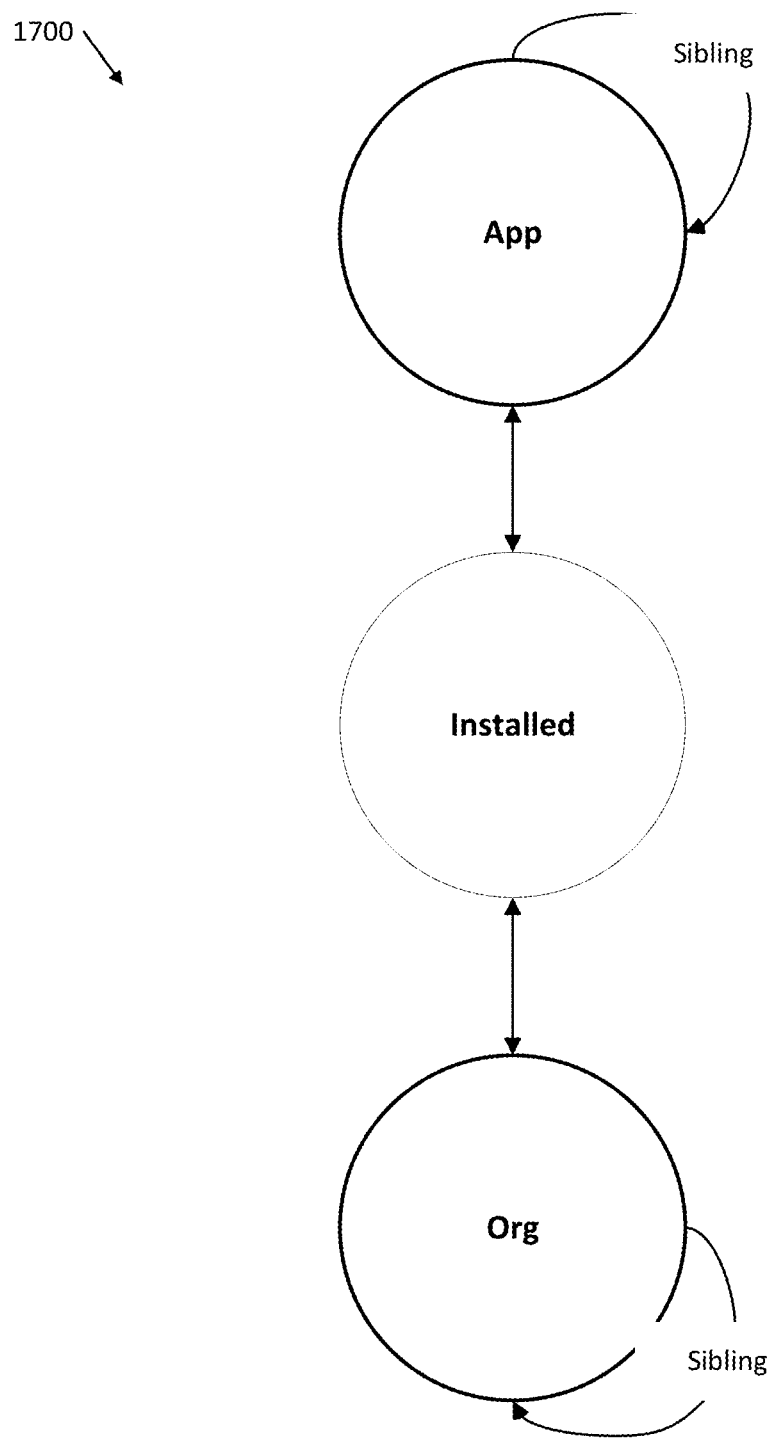
FIG. 17 is a logical schematic of the graph structure schema, according to some embodiments.

FIG. 17 is a logical schematic of the graph structure schema 300 depicting a first node representing an object of a first type (e.g., an app) connected by a first edge (e.g., the edge "installed") to a second node representing an object of a second type (e.g., an org). Both nodes are depicting with a siblings field of the node.

Compared to the time and memory capacity required to execute the original query Node A Edge×Node B Edge× Node A" where the graph 300 included 915,000 objects of the second object type, and 28,000 objects of the first object type, the further improved query Node A Node A (with count) completes in about 120 seconds, and uses about 5 MB of memory.

Referring now to FIG. 18, there is shown a process flow of a method 1800 for generating object type correlation data, according to some embodiments. The object type correlation data may depend on correlation score(s) for pairs of objects of a first object type. The correlation score of a pair may be indicative of a level of correlation between a first object of a first object type and a second object of the first object type.

In some embodiments, at 1802, the system 402, for example, the services module(s) 208 of the system 402, determines a first dataset. The first dataset may comprise a list of objects of the first object type and for each object, a set of objects of the first object type associated with the each object, and optionally, an object of the second object type associated with each object of the set. The first dataset may comprise information of the kind shown in the example of Table V. In some embodiments, the builder module may be configured to send a query to the read interface 206B of the graph structure 300, and in response to the query, to receive the first dataset. For example, the query may take the form of the modified query "Node A, Node A", as set out above.

At 1804, the system 402, for example, for example, the services module(s) 208 of the system 402, determines a dataset of pair(s) of first object types, each pair having an associated count indicative of a number of times the objects of the pair are both joined or connected by one hop through an object of a different type (i.e., an object common to the pair). In other words, the counts is indicative of the number of times the objects of the pair are both connected to common objects of a different object type.

For example, the system 402 may determine, a first array of first object type×first object type. Each vector of the array is associated with a particular object of the first object type, and for each object of the first object type, includes a value or count indicative of a number of times the object pair coexisted, or were both associated with the same objects of a different type. In other words, the count may be indicative of a number of paths between an object pair via a particular node type and a particular edge type. For example, where the first object type is apps, the second object type is orgs, and the edge is "installed", the count is indicative of the number of paths through orgs via "installed" edges the apps of a pair are connected by; in other words, the number of different orgs that installed both apps of the pair.

In some embodiments, the system 402 may determine the dataset of pairs from the first dataset. For example, the builder module may construct or generate the dataset by determining count for each object of the first object type associated with the candidate object, and populate a relevant cell of a first object type×first object type table with the total count.

In some embodiments, the system 402 transmits a read request to the read interface 206B of the graph interface module 206 to obtain the dataset comprising the set of pairs and associated count. As described above, the read request may be the further modified query in the form "Node A Node A (with count)". For example, the dataset may comprise a plurality of entries, each entry comprising a first object identifier of a first object type, a second object identifier of the first object type, and a count indicative of a number of first edges joining both objects of the first object type and an object of the second object type.

Figure 19:
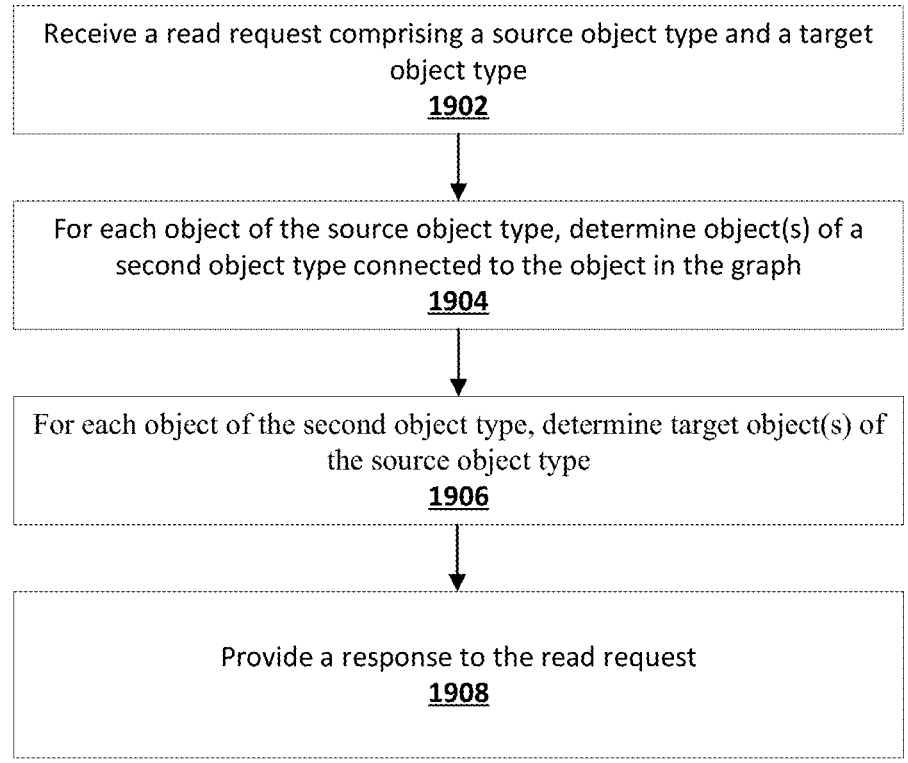
FIG. 19 is a process flow of a method for reading data from a graph structure, according to some embodiments.

Steps 1806 to 1812 correspond to steps 1006 to 1012 of method 1000 depicted in FIG. 10, or correspond to steps 1206 to 1212 of method 1200 depicted in FIG. 12.

Where the read request takes the form of the modified query, that is the form "Node A Node A, an alternative read method to that of method 700 of FIG. 7 may be used. In the case of "Node A Node A", the request may be populated with a first object type identifier in a first field and the first object type identifier in a second field of the request. FIG. 19 is a process flow of a method 1900 of reading data from the graph structure, according to some embodiments. The method 1900 may be implemented by the processor(s) 414 of system 402 executing computer instructions stored in memory 416, such as the graph interface module 206.

At 1902, the read interface 206B of the graph interface module 206 receives a read request. The read request comprises the further modified query in the form "Node A Node A". The read quest may identify a source object type and a target object type. The source and target object types may be the same. In some embodiments, the read interface 206B may receive the read request from one or more service modules 208, such as the app recommendation module 420, the business register module 422 and/or the correlation module 426.

At 1904, for each object of the source object type in the graph 300, the read interface 206B determines one or more objects of a second object type connected to the object identifier. The source object type may be apps and the second object type may be orgs, for example. In some embodiments, for each object identifier of the object type in the graph 300, the read interface 206B determines a source object key in a first object type vertex table. For example, the source object key may be an app identifier key. Using the source object key, the read interface 206B may determine one or more second object keys from a first edge table. For example, the second object keys may be org identifier keys.

At 1906, for each object of the second object type, the read interface 206B determines one or more target objects of the target object type. In some embodiments, the source object type may be the same as the target object type. In some embodiments, for each second object key, the read interface 206B determines one or more second object keys from a first edge table. Using the second object keys, the read interface 206B may determine one or more target object keys from a second edge table. For example, the target object key(s) for the second object key may be app identifier keys. The second edge table could be the first edge table.

At 1908, the read interface 206B provides a response to the read request. The response may comprise a first dataset. The first dataset may comprise a list of target object(s) (or target object identifier(s)) associated with each source object (or source object identifier), and optionally, second objects associated with each target object(s). In some embodiments, the read interface 206B determines, target object identifiers using the target object keys from a second object type vertex table. In some embodiments, the second object type vertex table may be the first object type vertex table. In that case, the source and target objects are objects of the same type.

In this way, the read interface 206B is configured to follow the path exemplified in FIG. 15. For each first object type, the read interface 206B follows a particular edge type to determine all of the objects of the second object type associated with the objects of the first object type and follows the same particular edge from those objects of the second object type to determine the objects of the first object type associated with them.

Figure 20:
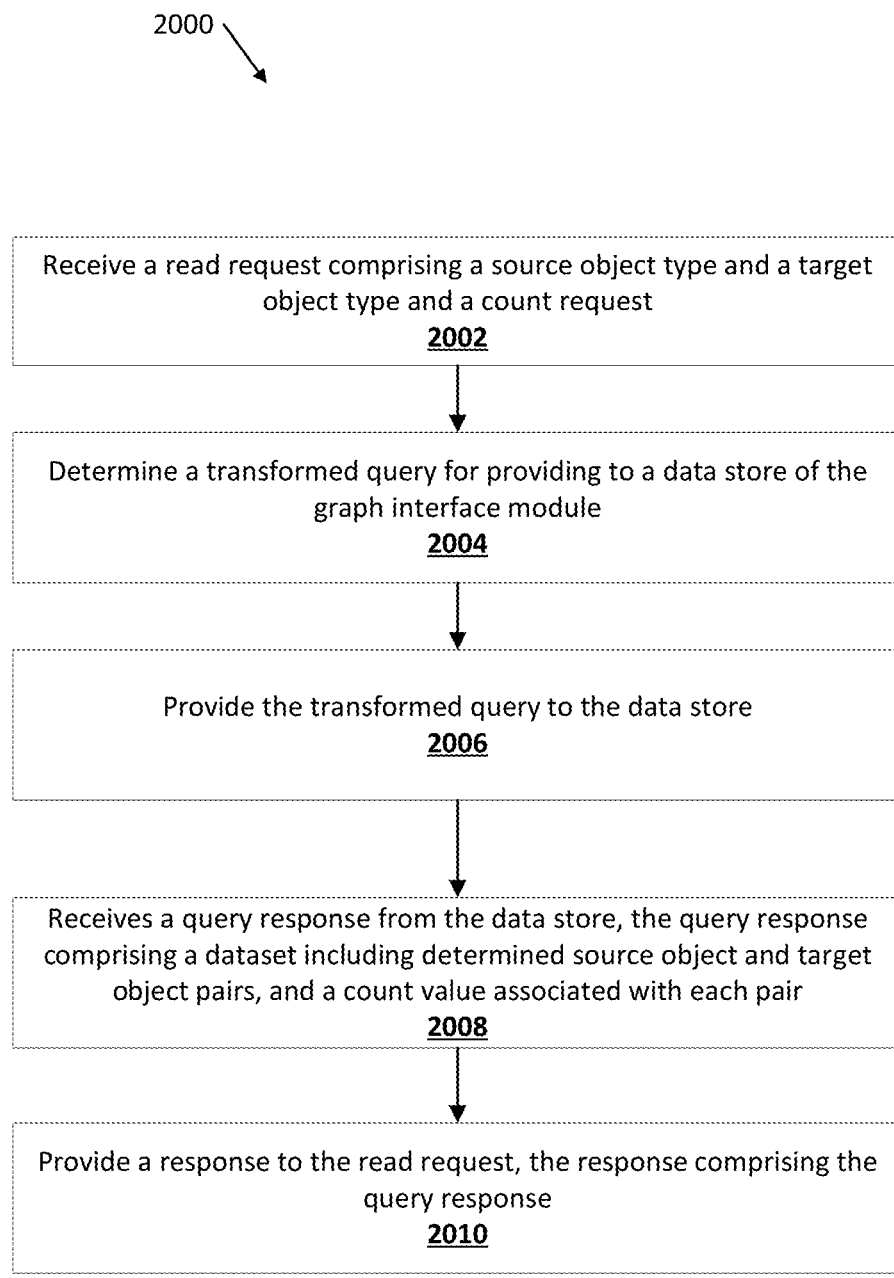
FIG. 20 is a process flow of a method for reading data from a graph structure, according to some embodiments.

At 1912, the read interface 206B provides a response to the read request. The response may comprise the first database. The first dataset may comprise a list of objects of the source object type, and for each object, a set of objects of the target object type associated with each object of the source object type, and optionally, an object of the second object type associated with each object of the set. An example of the output provided by the read interface 206B in response to the modified query is shown above in Table V. In some embodiments, the read interface 206B may provide the response to the one or more service modules 208, such as the app recommendation module 420, the business register module 422, and/or the correlation module 426. In some embodiments, the response is in the form of a nested list, such as a triple nested list. For example, the triple nested list may comprise a first set of objects of a source object type (e.g. a set of apps), and for each object of the source object type, a set of objects of a second object type ((e.g. a set of orgs), and for each of the set of objects of the second object type, a second set of objects of the target object type (e.g. a set of apps).

Where the read request takes the form of the further modified query, that is the form "Node A Node A (count)", an alternative read method to that of method 700 of FIG. 7 and method 1900 of FIG. 19 may be used. FIG. 20 is a process flow of a method 2000 of reading data from the graph structure, according to some embodiments. The method 2000 may be implemented by the processor(s) 414 of system 402 executing computer instructions stored in memory 416, such as the graph interface module 206.

At 2002, the read interface 206B of the graph interface module 206 receives a read request. The read request comprises the further modified query in the form "Node A Node A (Count)". The read quest may identify a source object type and a target object type. The source and target object types may be the same type or kind of objects. In the case of "Node A Node A (count)", the request may be populated with a first object type identifier in a first field and the first object type identifier in a second field of the request. The read request may comprise a count request for each source and target object pair, wherein the count request is a request for a number of times both objects of a target object type and source object type pair are both directly associated with objects of a second object type. For example, a directly associated or directly connected object of a source or target object type to an object of a second type object is one which is joined to the object of a second type object via an edge.

In some embodiments, the read interface 206B may receive the read request from one or more service modules 208, such as the app recommendation module 420, the business register module 422 and/or the correlation module 426.

At 2004, the read interface 206B determines a transformed query for providing to a data store 300 of the graph interface module 206. The read interface 206B may be configured to transform the read request into the transformed query, for example, using knowledge of the graph structure.

In some embodiments, the read interface 206B may be configured to compile an SQL query with JOINS and COUNT. In one example, the read interface 206B constructs a PostgreSQL query using, for instance, one or more table JOINs, and COUNT to request to corresponding count of source and target object types. This can be beneficial as the second object data need not be fetched—rather, it is only used to effect the respective JOIN operations by the data store.

In some embodiments, read interface 206B may be configured to transform the read request into the transformed query using knowledge of the graph structure, as may be stored as map data. Map data may reflect the mapping of the conceptual structure of the graph to the structure of the graph data as stored in the database. For instance, the database may include a relational database with node and edge tables, and the map data reflects the mapping of these tables to the conceptual nodes and edges of the graph. In some embodiments, the read interface 206B may be configured to compile an SQL query with JOINS and COUNT according to the map data.

The read request may be in the form of a GraphQL query. The transformed query may be in the form of a PostgreSQL query. The graph structure 300 may be a PostgreSQL data store.

At 2006, the read interface 206B provides the transformed query to the data store 300.

At 2008, the read interface 206B receives a query response from the data store. The query response may comprises a dataset comprising the determined source object and target object pairs, and a count value associated with each pair.

At 2010, the read interface 206B, provides a response to the read request. The response comprises the query response.

The query response may be used by the service module(s) to generate a first object type×first object type array that includes a number of times each object of a pair was associated with the other object of the pair, for example joined by one hop via an object of a second object type. For example, the app recommendation module 420 may use the query response to determine an apps×apps array which includes a number of times each app was installed alongside each other app of the pair, as depicted in Table III above.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.
database.

What is claimed is:

1. A computer-implemented method comprising:
determining a dataset comprising a plurality of entries, each entry comprising an entity identifier of a plurality of entity identifiers and one or more associated application identifiers of a plurality of application identifiers, each application identifier identifying an application used by an entity of a respective entity identifier;
determining a set of application pairs from the dataset, each application pair comprising a first application identifier and a second application identifier;
determining a correlation score for each application pair of the set based on an association of the first and second application identifiers of the application pair with the plurality of entity identifiers of the dataset, wherein the correlation score is based on a first number of entity identifiers of the dataset with which the first application identifier of the application pair is associated, a second number of entity identifiers of the dataset with which the second application identifier of the application pair is associated, and a third number of entity identifiers of the dataset with which the first and second application identifiers of the application pair are both associated;
responsive to the correlation score for the application pair exceeding a threshold correlation value:
determining the first and second application identifiers of the application pair as being correlated;
determining a correlation write request comprising the first and second applications identifiers of the application pair;
providing the correlation write request to a write interface of an app recommender graph interface module for writing to respective tables of an app recommender graph structure of an app recommender database for storing the first and second applications identifiers of the application pair as a correlated pair,
receiving an application recommendation request comprising a candidate application identifier of one or more of the correlated pairs stored in the app recommender database; and
responsive to the application recommendation request, providing, by the app recommender database, one or more suggested application identifiers of respective suggested applications, wherein each of the one or more suggested application identifiers forms a respective correlated pair with the candidate application identifier;
wherein providing the correlation write request to the write interface of the app recommender graph interface module comprises:
determining a plurality of correlation write requests to be written to the app recommender graph structure;
collating the plurality of correlation write requests as a batch write request; and
providing the batch write request to the write interface of the app recommender graph interface module.

2. The method of claim 1, wherein the correlation score is indicative of a frequency of a first and second application of the application pair both being associated with a same organization identifier of organization identifiers of the dataset relative to the frequency of the first application and the second application being independently associated with the organization identifiers of the dataset.

3. The method of claim 1, wherein determining the correlation score comprises determining pointwise mutual information (PMI) of the application pairs.

4. The method of claim 1, wherein each entry of the dataset comprises a timestamp indicative of a freshness of a relationship between the entity identifier and the application identifier, and wherein the method further comprises:
prior to determining the set of application pairs from the dataset and responsive to the timestamp being greater than a threshold, determining the entry as stale and excluding it from the dataset.

5. The method of claim 1, further comprising:
determining a usage relationship between each of the plurality of application identifiers and the respective entity identifier of the dataset;
for each entity identifier and application identifier pair:
determining a usage write request comprising the entity identifier and application identifier of the pair; and
providing the usage write request to a write interface of a graph interface module for writing to respective tables of a graph structure.

6. The method of claim 5, wherein each entry of the dataset comprises a timestamp indicative of a freshness of a relationship between the entity identifier and the application identifier and where the method further comprises:
prior to determining the usage write request and responsive to the timestamp being greater than a threshold, determining the entry as stale and excluding it from the dataset.

7. The method of claim 1, wherein determining the dataset comprises:
for each entry of the dataset, determining connection data between the entity identifier and each application identifier of the one or more associated application identifiers, wherein the connection data is indicative of a connection request being made by the entity of the entity identifier to an application service provider providing the application of the application identifier.

8. The method of claim 7, wherein responsive to determining connection data between an entity identifier of the plurality of entity identifiers and a respective application identifier, inferring that the entity of the entity identifier has used the application of the application identifier.

9. A system comprising:
one or more processors; and
memory comprising computer executable instructions, which when executed by the one or more processors, cause the system to:
determine a dataset comprising a plurality of entries, each entry comprising an entity identifier of a plurality of entity identifiers and one or more associated application identifiers of a plurality of application identifiers, each application identifier identifying an application used by an entity of a respective entity identifier;
determine a set of application pairs from the dataset, each application pair comprising a first application identifier and a second application identifier;
determine a correlation score for each application pair of the set based on an association of the first and second application identifiers of the application pair with the plurality of entity identifiers of the dataset, wherein the correlation score is based on a first number of entity identifiers of the dataset with which the first application identifier of the application pair is associated, a second number of entity identifiers of the dataset with which the second application identifier of the application pair is associated, and a third number of entity identifiers of the dataset with which the first and second application identifiers of the application pair are both associated;

responsive to the correlation score for them application pair exceeding a threshold correlation value:
  determine the first and second application identifiers of the application pair as being correlated;
  determine a correlation write request comprising the first and second applications identifiers of the application pair; and
  provide the correlation write request to a write interface of an app recommender graph interface module for writing to respective tables of an app recommender graph structure of an app recommender database for storing the first and second applications identifiers of the application pair as a correlated pair;

receive an application recommendation request comprising a candidate application identifier of one or more of the correlated pairs stored in the app recommender database; and responsive to the application recommendation request, provide, by the app recommender database, one or more suggested application identifiers of respective suggested applications, wherein each of the one or more suggested application identifiers forms a respective correlated pair with the candidate application identifier;
  wherein providing the correlation write request to the write interface of the app recommender graph interface module comprises causing the system to:
    determine a plurality of correlation write requests to be written to the app recommender graph structure;
    collate the plurality of correlation write requests as a batch write request; and
    provide the batch write request to the write interface of the app recommender graph interface module.

10. A computer-readable storage medium storing instructions that, when executed by a computer, cause the computer to perform operations including:
  determining a dataset comprising a plurality of entries of a plurality of entity identifiers, each entry comprising an entity identifier and one or more associated application identifiers of a plurality of application identifiers, each application identifier identifying an application used by an entity of a respective entity identifier;
  determining a set of application pairs from the dataset, each application pair comprising a first application identifier and a second application identifier;
  determining a correlation score for each application pair of the set based on an association of the first and second application identifiers of the application pair with the plurality of entity identifiers of the dataset, wherein the correlation score is based on a first number of entity identifiers of the dataset with which the first application identifier of the application pair is associated, a second number of entity identifiers of the dataset with which the second application identifier of the application pair is associated, and a third number of entity identifiers of the dataset with which the first and second application identifiers of the application pair are both associated;
  responsive to the correlation score for the application pair exceeding a threshold correlation value:
    determining the first and second application identifiers of the application pair as being correlated;
    determining a correlation write request comprising the first and second applications identifiers of the application pair; and
    providing the correlation write request to a write interface of an app recommender graph interface module for writing to respective tables of an app recommender graph structure of an app recommender database for storing the first and second applications identifiers of the application pair as a correlated pair;
  receiving an application recommendation request comprising a candidate application identifier of one or more of the correlated pairs stored in the app recommender database; and
  responsive to the application recommendation request, providing, by the app recommender database, one or more suggested application identifiers of respective suggested applications, wherein each of the one or more suggested application identifiers forms a respective correlated pair with the candidate application identifier,
  wherein providing the correlation write request to the write interface of the app recommender graph interface module comprises:
    determining a plurality of correlation write requests to be written to the app recommender graph structure;
    collating the plurality of correlation write requests as a batch write request; and
    providing the batch write request to the write interface of the app recommender graph interface module.

* * * * *